United States Patent
Okumura

(10) Patent No.: US 10,497,132 B2
(45) Date of Patent: Dec. 3, 2019

(54) IRRADIATION SYSTEM, IRRADIATION METHOD, AND PROGRAM STORAGE MEDIUM

(71) Applicant: NEC Corporation, Minato-ku, Tokyo (JP)

(72) Inventor: Fujio Okumura, Tokyo (JP)

(73) Assignee: NEC CORPORATION, Tokyo (JP)

(*) Notice: Subject to any disclaimer, the term of this patent is extended or adjusted under 35 U.S.C. 154(b) by 35 days.

(21) Appl. No.: 15/742,126

(22) PCT Filed: Jul. 15, 2016

(86) PCT No.: PCT/JP2016/003342
§ 371 (c)(1),
(2) Date: Jan. 5, 2018

(87) PCT Pub. No.: WO2017/013863
PCT Pub. Date: Jan. 26, 2017

(65) Prior Publication Data
US 2018/0197300 A1    Jul. 12, 2018

(30) Foreign Application Priority Data

Jul. 17, 2015   (JP) .................. 2015-142771

(51) Int. Cl.
*G06K 9/00* (2006.01)
*G06T 7/246* (2017.01)
(Continued)

(52) U.S. Cl.
CPC .......... *G06T 7/246* (2017.01); *G06K 9/00221* (2013.01); *G06K 9/00369* (2013.01);
(Continued)

(58) Field of Classification Search
CPC ......... G06T 7/246; G06T 7/262; G06T 7/248; G06T 7/20; G06T 7/70; G06T 5/50;
(Continued)

(56) References Cited

U.S. PATENT DOCUMENTS 7,483,049 B2 * 1/2009 Aman ................ A63B 24/0021
348/162
9,357,183 B2 * 5/2016 Cordero ........... G08B 13/19636
(Continued)

FOREIGN PATENT DOCUMENTS

JP   H11-251074 A    9/1999
JP   2002-298261 A   10/2002
(Continued)

OTHER PUBLICATIONS

C. Pinhanez, "Everywhere Displays Projector: A Device to Create Ubiquitous Graphical Interfaces," IBM Thomas Watson Research Center, searched on May 7, 2014, Internet, 18 pages.
(Continued)

*Primary Examiner* — Jose L Couso

(57) ABSTRACT

Provided is an irradiation system for reliably detecting a desired detection target and precisely irradiating marking light on the detected detection target. The irradiation system includes: a server device detecting, by authentication processing, a detection target from image data capturing a monitored area, generating, from each piece of a plurality of pieces of image data captured in a time span including a capture time of image data in which the detection target is detected, lightweight data obtained by lightening an amount of data in the plurality of pieces of image data, and transmitting tracking data obtained by aggregating a plurality of pieces of generated lightweight data; and a terminal device capturing the monitored area and outputting image data, transmitting the captured image data to the server device and also receiving the tracking data from the server device, and irradiating light on the detection target, based on the received tracking data.

19 Claims, 39 Drawing Sheets

(51) Int. Cl.
*G08B 13/196* (2006.01)
*H04N 7/18* (2006.01)
*G06T 7/262* (2017.01)
*G06K 9/20* (2006.01)
*G08B 25/08* (2006.01)

(52) U.S. Cl.
CPC ..... *G06K 9/00664* (2013.01); *G06K 9/00771* (2013.01); *G06K 9/2027* (2013.01); *G06K 9/2054* (2013.01); *G06T 7/248* (2017.01); *G06T 7/262* (2017.01); *G08B 13/196* (2013.01); *H04N 7/18* (2013.01); *H04N 7/181* (2013.01); *G06T 2207/10* (2013.01); *G06T 2207/10024* (2013.01); *G06T 2207/30196* (2013.01); *G08B 25/08* (2013.01)

(58) Field of Classification Search
CPC ....... G06T 2207/10; G06T 2207/10024; G06T 2207/30196; G06T 2207/10016; G06T 2207/20016; G06T 2207/10048; G06T 2207/30241; G06T 2207/30232; G06T 2207/20221; G06K 9/00221; G06K 9/00369; G06K 9/00664; G06K 9/00771; G06K 9/2027; G06K 9/2054; G06K 9/00335; G06K 9/00342; G06K 9/3241; G06K 9/4604; G06K 9/6202; G06K 9/6215; G06K 9/6267; G06K 9/3216; G08B 13/196; G08B 13/19608; G08B 13/19613; G08B 13/18; G08B 13/181; G08B 13/186; G08B 13/189; G08B 13/19; G08B 13/194; G08B 13/19602; G08B 13/1961; G08B 13/1965; G08B 13/19647; H04N 7/18; H04N 7/181; H04N 7/183; H04N 7/185; H04N 5/232; H04N 5/23293; H04N 5/2256; H04N 5/332; A01M 29/10; B64C 13/20; B64D 47/02; F41G 3/145; F41G 7/226; G01S 17/66; G08G 1/01; G08G 5/0082; G05D 1/0033

See application file for complete search history.

(56) References Cited

U.S. PATENT DOCUMENTS

| | | | |
|---|---|---|---|
| 2009/0268074 | A1 | 10/2009 | Sugino |
| 2009/0304234 | A1 | 12/2009 | Kondo et al. |
| 2015/0336015 | A1* | 11/2015 | Blum ..................... A63G 33/00 472/137 |
| 2016/0371851 | A1* | 12/2016 | Zhang ................. G06F 16/5854 |
| 2017/0138732 | A1* | 5/2017 | Pettersson ............. B64C 39/024 |
| 2017/0248948 | A1* | 8/2017 | Otani ........................ G06T 7/70 |
| 2017/0374261 | A1* | 12/2017 | Teich ....................... H04N 5/33 |
| 2018/0203120 | A1* | 7/2018 | Nagalla ................ G01C 15/002 |

FOREIGN PATENT DOCUMENTS

| | | |
|---|---|---|
| JP | 2006-255027 A | 9/2006 |
| JP | 2009-218719 A | 9/2009 |
| JP | 2009-294983 A | 12/2009 |
| JP | 2010-238187 A | 10/2010 |
| JP | 2010-238188 A | 10/2010 |

OTHER PUBLICATIONS

International Search Report for PCT Application No. PCT/JP2016/003342, dated Oct. 4, 2016.
English translation of Written opinion for PCT Application No. PCT/JP2016/003342.

* cited by examiner

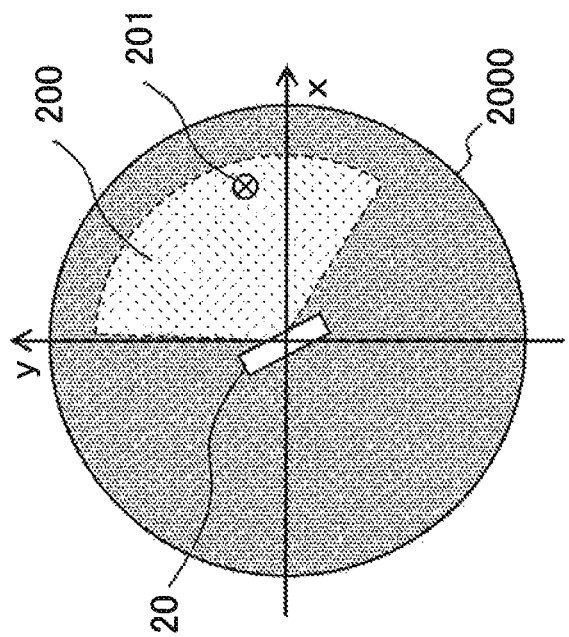
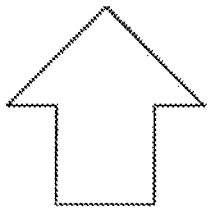
Fig.35
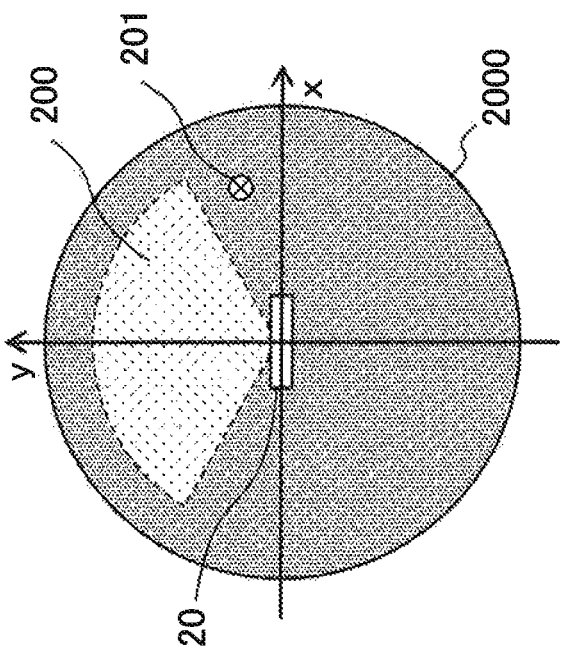

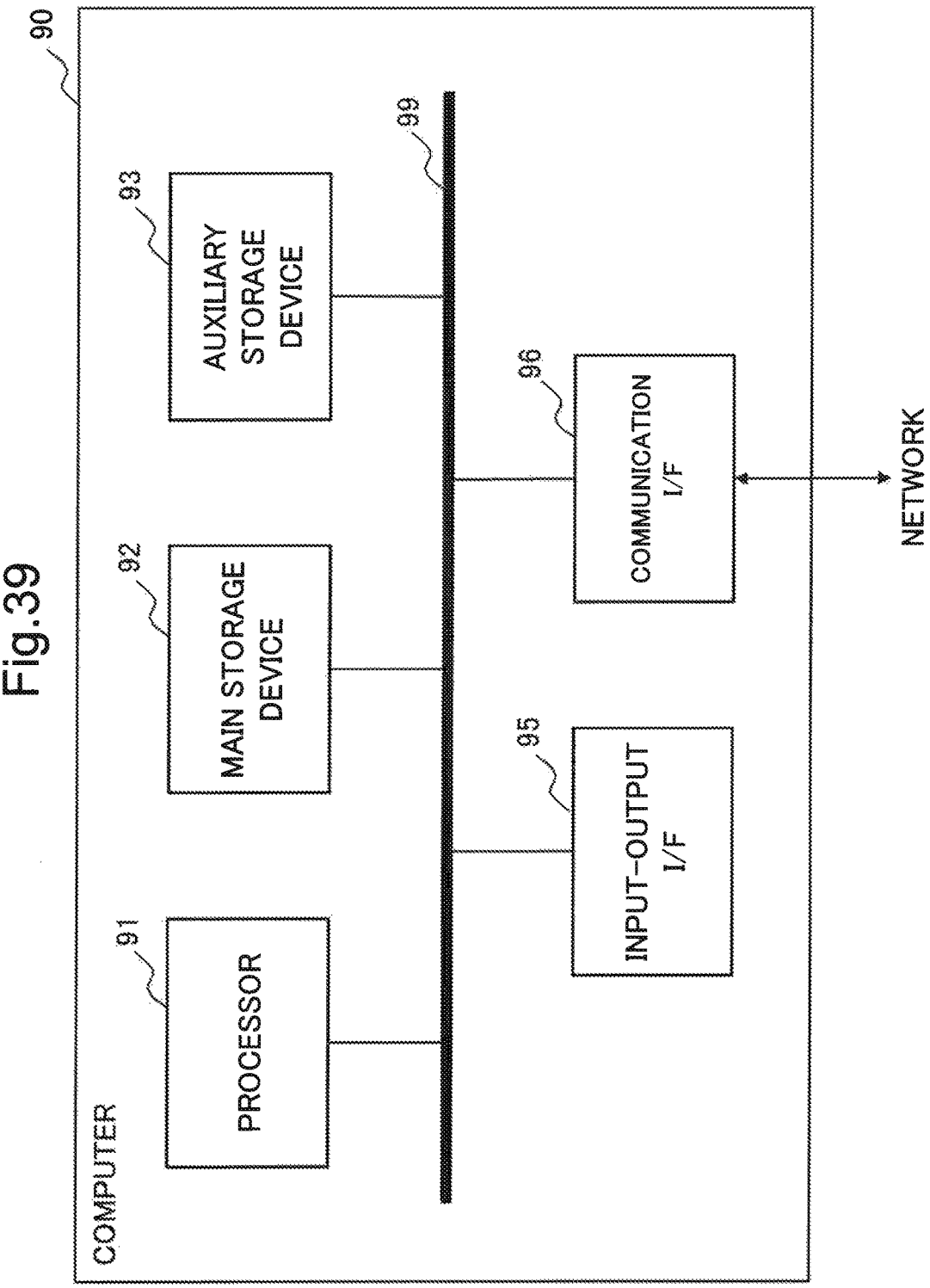

IRRADIATION SYSTEM, IRRADIATION METHOD, AND PROGRAM STORAGE MEDIUM

This application is a National Stage Entry of PCT/JP2016/003342 filed on Jul. 15, 2016, which claims priority from Japanese Patent Application 2015-142771 filed on Jul. 17, 2015, the contents of all of which are incorporated herein by reference, in their entirety.

TECHNICAL FIELD

The present invention relates to an irradiation system, an irradiation method, and an irradiation program for recognizing a detection target.

BACKGROUND ART

A safer society can be realized when a detection target such as a suspicious person or a criminal can be reliably detected in a crowd. Thanks to progress in a face authentication technology and the like, authentication of a detection target from an image captured by a surveillance camera or the like has become feasible in recent years. By using the face authentication technology, a detection target can be extracted from an image captured by a surveillance camera.

Further, development of an interface device combining a projector with a camera has been under way in recent years. Such an interface device provides an interactive operation by detecting, with a camera, a manipulation performed on an image projected from a projector. NPL 1 discloses an interface device combining a projector with a camera.

For example, when the interface device is configured as a wearable device, and a user attached with the device moves around on the streets, a detection target can be detected from image data captured by the camera, and light for marking can be projected on the detection target from the projector.

In general, authentication processing such as object authentication and face authentication is heavy. Accordingly, when an interface device configured as a wearable device recognizes a detection target and takes some action on the detection target, a processing speed of an arithmetic device that can be equipped on the wearable device may be insufficient. Further, a scheme that the interface device transmits acquired image data to a server, and the server performs high-speed processing and returns positional information of the detection target to the interface device may be considered. However, real time action may not be taken on the detection target due to a communication delay. When real time action cannot be taken, the detection target may go out of an angle of view of a camera due to the target object moving or a person attached with the wearable device changing direction, thus causing a state that the detection target cannot be recognized.

PTL 1 discloses a tracking point detection device that reliably tracks a tracking point by lightening an image including the tracking point and further thinning out frames. The device in PTL 1 detects the tracking point included in thinned-out frames from both a forward direction and a reverse direction temporally, and determines coordinates of the tracking point in the image before frames are thinned out.

PTL 2 discloses an imaging device that generates display information providing a warning not to cause a tracking target to go out of frame, and displays the display information associated with the tracking target on a display screen.

PTL 3 discloses a surveillance system that performs face authentication by using a facial image of a visitor to a game arcade and associates positional information of the visitor with the facial image. The system in PTL 3 checks the facial image of the visitor against a facial image of an improper player, and when the visitor is an improper player, makes a report.

CITATION LIST

Patent Literature

[PTL 1] Japanese Unexamined Patent Application Publication No. 2009-294983
[PTL 2] Japanese Unexamined Patent Application Publication No. 2009-218719
[PTL 3] Japanese Unexamined Patent Application Publication No. 2006-255027

Non Patent Literature

[NPL 1] C. Pinhanez, "Everywhere Displays Projector," (online), IBM, searched on May 7, 2014, Internet <URL: http://www.research.ibm.com/people/p/pinhanez/publications/ubico mp01.pdf>

SUMMARY OF INVENTION

Technical Problem

The device in PTL 1 is able to lighten processing of tracking a tracking target, and therefore is able to reliably track the tracking target. However, the device in PTL 1 has a problem that coordinates of a tracking point cannot be determined in real time.

The device in PTL 2 is able to provide a warning not to cause a tracking target to go out of frame. However, the device in PTL 2 has a problem that a direction of an irradiation target originally being out of frame cannot be indicated.

The system in PTL 3 is able to detect an improper player by cooperation between servers. However, the system in PTL 3 has a problem that a time lag is caused when a communication delay occurs between the servers.

An object of the present invention is to provide an irradiation system capable of reliably detecting a desired detection target and precisely irradiating light for marking on the detected detection target.

Solution to Problem

An irradiation system according to the present invention includes: a server device that detects, by authentication processing, a detection target from image data capturing a monitored area, generates, from each piece of a plurality of pieces of image data captured in a time span including a capture time of image data in which the detection target is detected, lightweight data obtained by lightening an amount of data in the plurality of pieces of image data, and transmits tracking data obtained by aggregating a plurality of pieces of generated lightweight data; and a terminal device that captures the monitored area and outputs image data, transmits the captured image data to the server device and also receives the tracking data from the server device, and irradiates light on the detection target, based on the received tracking data.

An irradiation method according to the present invention includes: capturing a monitored area and generating image data; detecting a detection target from image data of the monitored area by authentication processing; generating, from each piece of a plurality of pieces of image data captured in a time span including a capture time of image data in which the detection target is detected, lightweight data obtained by lightening an amount of data in the plurality of pieces of image data; and irradiating light on the detection target, based on tracking data obtained by aggregating a plurality of pieces of generated lightweight data.

An irradiation program according to the present invention causes a computer to perform: processing of capturing a monitored area and generating image data; processing of detecting a detection target from image data of the monitored area by authentication processing; processing of generating, from each piece of a plurality of pieces of image data captured in a time span including a capture time of image data in which the detection target is detected, lightweight data obtained by lightening an amount of data in the plurality of pieces of image data; and processing of irradiating light on the detection target, based on tracking data obtained by aggregating a plurality of pieces of generated lightweight data.

Advantageous Effects of Invention

The present invention is able to provide an irradiation system capable of reliably detecting a desired detection target and precisely irradiating light for marking on the detected detection target.

BRIEF DESCRIPTION OF DRAWINGS

FIG. 35 is a conceptual diagram illustrating an example of the terminal device in the irradiation system according to the fourth example embodiment of the present invention changing an imaging direction, based on positional information.

FIG. 39 is a block diagram illustrating a configuration example of hardware constituting the irradiation systems according to the respective example embodiments of the present invention.

DESCRIPTION OF EMBODIMENTS

Example embodiments of the present invention will be described below using drawings. However, while a technically preferable limitation for implementing the present invention is imposed on the example embodiments described below, the limitation does not limit the scope of the invention to the following. Note that, in all diagrams used for description of the following example embodiments, unless there is a specific reason, a same reference sign is given to similar parts. Further, repeated description of a similar configuration or operation may be omitted in the description of the following example embodiments.

(First Example Embodiment)
(Configuration)

First, a configuration of an irradiation system according to a first example embodiment of the present invention will be described referring to drawings.

Figure 1:
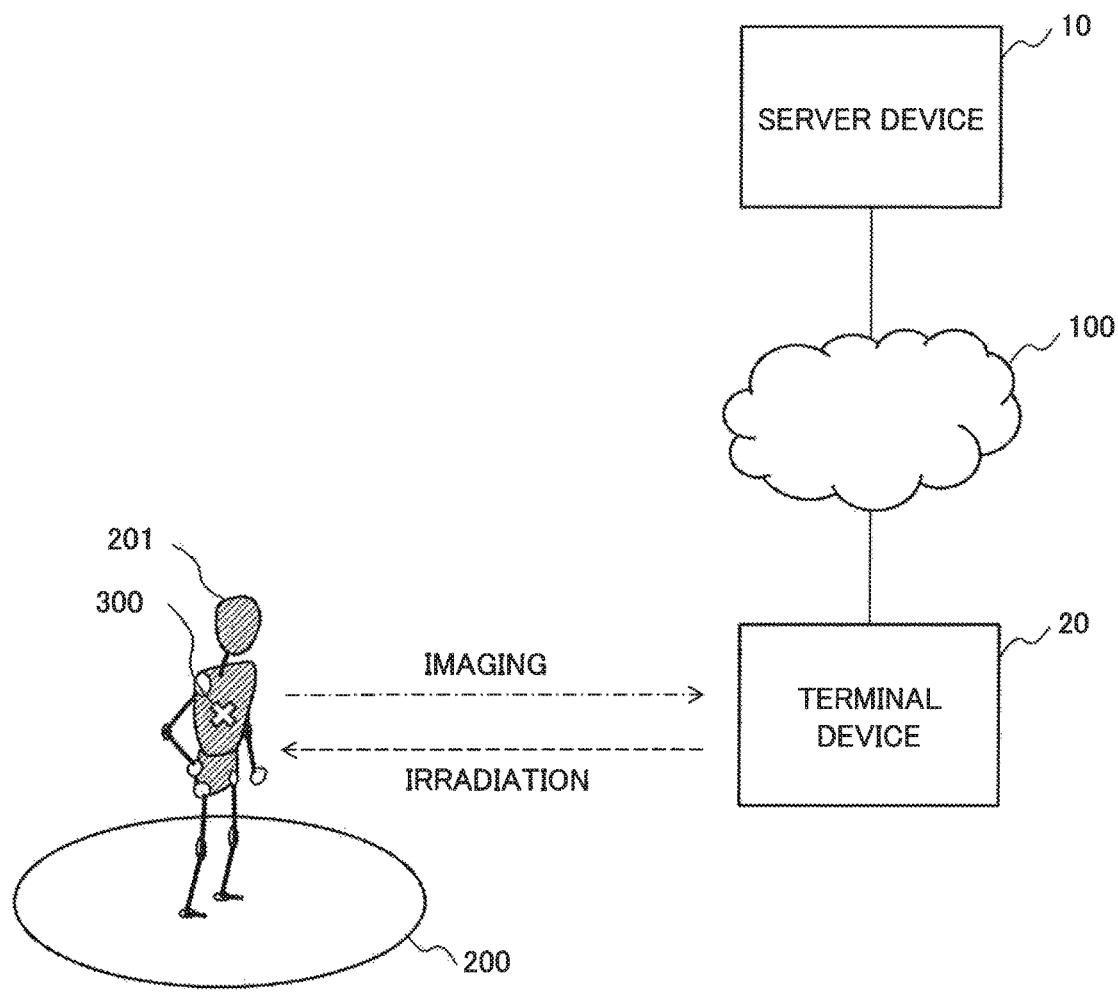
FIG. 1 is a conceptual diagram illustrating a configuration of an irradiation system according to a first example embodiment of the present invention.

As illustrated in FIG. 1, the irradiation system according to the present example embodiment includes a server device 10 and a terminal device 20. The server device 10 and the terminal device 20 are connected by a network 100 and exchange data with one another.

Figure 2:
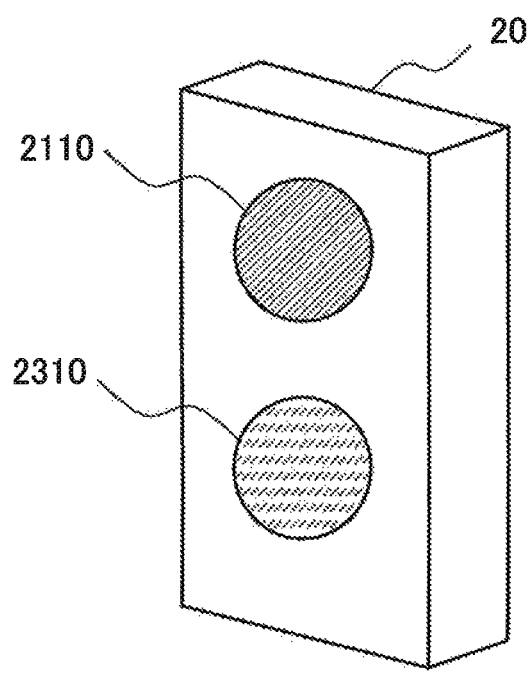
FIG. 2 is a conceptual diagram of a terminal device in the irradiation system according to the first example embodiment of the present invention.
Figure 3:
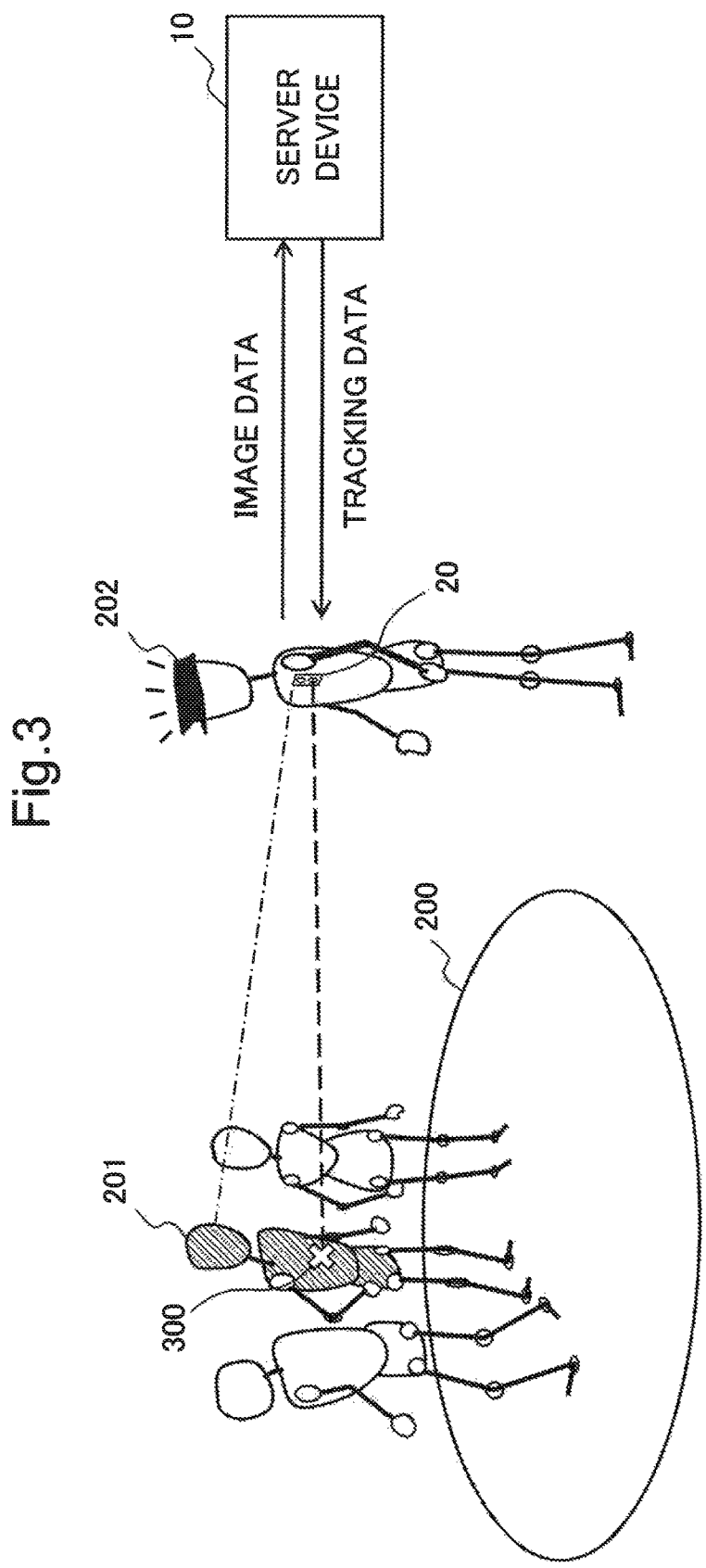
FIG. 3 is a conceptual diagram illustrating a use scene of the irradiation system according to the first example embodiment of the present invention.

As illustrated in FIG. 2, the terminal device 20 includes a camera window 2110 for an imaging function to capture a monitored area 200, and a projection window 2310 for a projection function to irradiate light for marking (hereinafter referred to as marking light 300) on a detection target 201. It is preferable that the terminal device 20 be a wearable terminal attached to the chest or the like of a detector 202, as illustrated in FIG. 3. The terminal device 20 captures the monitored area 200 and transmits image data of the captured monitored area 200 to the server device 10.

The server device 10 receives image data from the terminal device 20 and sequentially saves the received image data. Then, the server device 10 analyzes any frame in the received image data. When detecting a detection target 201 from the analyzed image data, the server device 10 lightens the image data and generates tracking data for tracking the detection target 201. The server device 10 transmits the generated tracking data to the terminal device 20.

Further, when receiving tracking data from the server device 10, the terminal device 20 recognizes a detection target 201 by using the received tracking data. The terminal device 20 irradiates the marking light 300 on the recognized detection target 201.

(Server Device)

Figure 4:
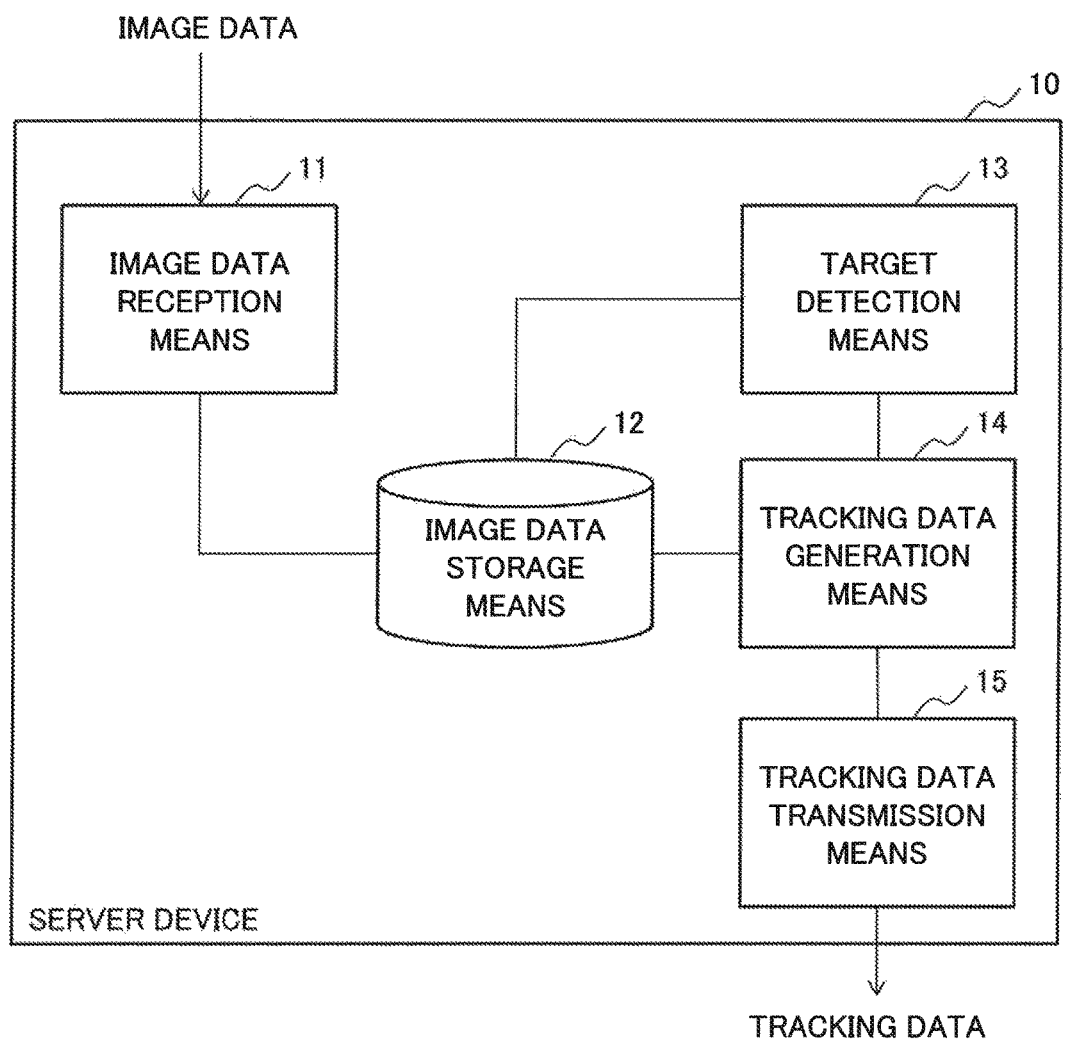
FIG. 4 is a block diagram illustrating a configuration of a server device in the irradiation system according to the first example embodiment of the present invention.

Next, using FIG. 4, a configuration of the server device 10 will be described in detail. As illustrated in FIG. 4, the server device 10 includes an image data reception means 11, an image data storage means 12, a target detection means 13, a tracking data generation means 14, and a tracking data transmission means 15.

The image data reception means 11 receives image data from the terminal device 20 and sequentially saves the received image data in the image data storage means 12. For example, the image data reception means 11 may be provided by a communication interface.

The image data storage means 12 saves image data received by the image data reception means 11. For example, the image data storage means 12 may be provided by a storage device.

The target detection means 13 acquires image data from the image data storage means 12. The target detection means 13 detects a detection target 201 by using an authentication algorithm such as face authentication or personal authentication. When a detection target 201 is detected by face authentication, for example, the target detection means 13 may be provided by a face detection/face matching engine. While an example of authenticating a detection target by face authentication will be described below, the detection target 201 may be detected by using a technique other than the face authentication, such as human detection or object detection.

For example, the target detection means 13 extracts a feature from a facial image included in image data. For example, the target detection means 13 may focus on features included in a relative position, sizes, and shapes of components of a face such as an eye, a nose, and an ear. Further, the target detection means 13 may focus on characteristic factors such as color of skin, a wrinkle, a blotch, and a mole. Further, the target detection means 13 may generate and prepare standard data from many facial images and focus on a difference between a facial image in image data and the standard data.

The target detection means 13 compares the extracted facial image with an image stored in a database (unillustrated). When finding an image matching the extracted facial image on the database, the target detection means 13 detects a target associated with the image as a detection target 201.

When detecting a detection target 201 from image data, the target detection means 13 generates information for identifying the detection target 201 on the image data. For example, the target detection means 13 may generate information for identifying the detection target 201 such as positional information of the detection target 201 on the image data, information about an area surrounding the detection target 201, and histograms of color information and brightness information of the detection target 201.

The target detection means 13 outputs the information for identifying the detection target 201 and the image data (hereinafter referred to as first image data) in which the detection target 201 is detected to the tracking data generation means 14. The target detection means 13 outputs the first image data to the tracking data generation means 14.

The tracking data generation means 14 acquires first image data from the target detection means 13 and generates data (hereinafter referred to as lightweight data) obtained by lightening the acquired first image data. The lightweight data are not an image itself and, for example, are information including a feature point for identifying a detection target 201, a histogram of colors of an area including the detection target 201, and the like.

For example, the tracking data generation means 14 generates lightweight data by using a technique such as Camshift or Meanshift. For example, the tracking data generation means 14 may generate lightweight data by using an estimation method such as a particle filtering method. For example, the tracking data generation means 14 may generate lightweight data by using a feature extraction method such as scale-invariant feature transform (SIFT) or histograms of oriented gradients (HOG). Further, for example, the tracking data generation means 14 may generate lightweight data by using a feature extraction method such as speeded up robust features (SURF). Furthermore, the tracking data generation means 14 may use a technique different from the above as long as first image data can be lightened.

Further, the tracking data generation means 14 acquires from the image data storage means 12 a series of image data (hereinafter referred to as a first image data group) captured in a time span around a time when first image data are captured. The tracking data generation means 14 thins out frames constituting the first image data group and selects a plurality of pieces of image data (hereinafter referred to as a second image data group).

The tracking data generation means 14 detects a detection target by using lightweight data of first image data in image data captured at a time around a time when the first image data are captured, out of respective pieces of image data constituting the second image data group. Then, the tracking data generation means 14 generates lightweight data of image data in which the detection target is detected. By using the generated lightweight data, the tracking data generation means 14 further successively generates lightweight data from another piece of image data and accumulates the generated lightweight data. By thus using accumulated lightweight data, a detection target changing a posture moment by moment can be recognized as the same target.

For example, assuming that a frame rate at which image data are captured is 60 hertz, a frame interval becomes around 16 milliseconds. When the image data are thinned out at intervals of every 10 frames, the frame interval becomes around 160 milliseconds. Tracking of a detection target can be continued with lightweight data at this level of intervals even when the detection target changes a posture to some degree.

At a time point when the tracking data generation means 14 generates lightweight data from first image data, time is expended on recognition processing of a detection target, and therefore the time when the first image data are captured deviates from the current time. As the tracking data generation means 14 generates lightweight data from another piece of image data by using lightweight data, lightweight data are eventually generated at a time almost close to a current time. Data including a lightweight data group generated from image data constituting a second image data group are hereinafter referred to as tracking data.

It takes a certain time for the tracking data generation means 14 to select image data and generate lightweight data from the image data. Accordingly, an interval between a time when original image data of lightweight data are captured and a current time eventually becomes constant. By using lightweight data at this stage, the terminal device 20 is able to recognize a detection target at a current time. Accordingly, at a stage when lightweight data related to an almost current frame are generated, the tracking data generation means 14 may output the tracking data to the tracking data transmission means 15.

Furthermore, the tracking data generation means 14 may generate lightweight data with respect to image data at a specific time or may generate lightweight data with respect to all image data included in an image data group in which a detection target 201 is detected.

In the irradiation system according to the present example embodiment, the terminal device 20 generates image data while capturing the monitored area 200 in real time and transmits the image data to the server device 10, and authentication processing such as face authentication is performed on the server device 10 side. Accordingly, an excessively large amount of processing and communication traffic causes a coincidence of a communication delay between the terminal device 20 and the server device 10, a processing delay in the server device 10, and the like.

For example, assuming that, as a result of analysis of image data captured at a first time, a detection target 201 is detected at a second time later than the second time, new image data are already captured between the first time and the second time. When the detection target 201 moves in the period, the detection target 201 may not be recognized with lightweight data at the old time (first time).

Accordingly, the present example embodiment thins out and selects image data around the first time and successively generates lightweight data from the selected image data. As lightweight data are generated from image data at a time later than the first time, lightweight data at a time closer to a current time are eventually generated. In practice, time elapses while performing communication and image processing, and therefore, strictly speaking, lightweight data at a current time cannot be generated. Accordingly, the tracking data generation means 14 generates lightweight data at a time close to a current time.

The tracking data transmission means 15 transmits tracking data generated by the tracking data generation means 14 to the terminal device 20. For example, the tracking data transmission means 15 can be provided by a communication interface, similarly to the image data reception means 11. The tracking data transmission means 15 may be configured to be the same communication interface as the image data reception means 11.

(Tracking Data Generation Means)

Figure 5:
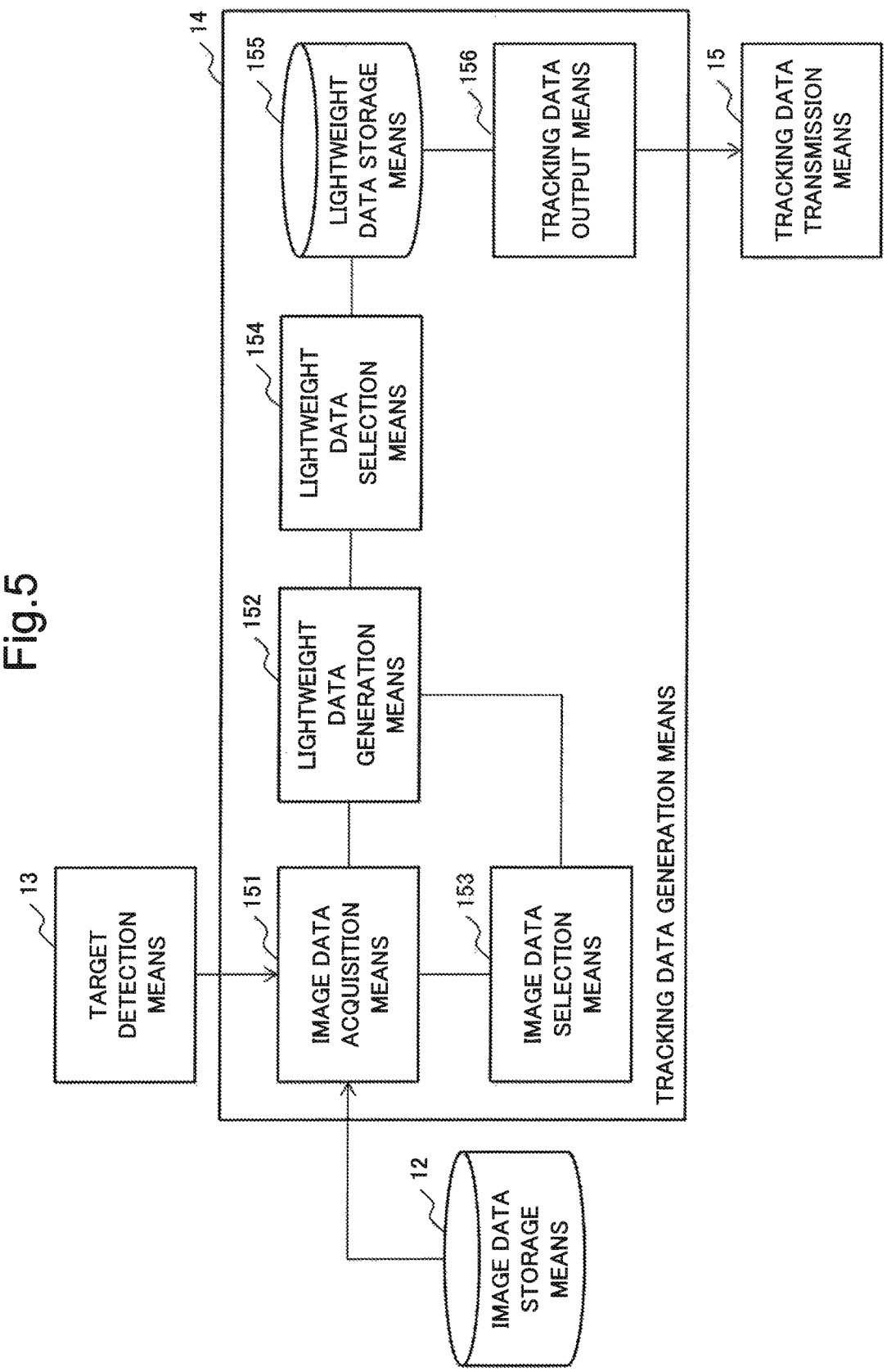
FIG. 5 is a block diagram illustrating a configuration of a tracking data generation means included in the server device in the irradiation system according to the first example embodiment of the present invention.

Using FIG. 5, a configuration of the tracking data generation means 14 will be described here in detail. As illustrated in FIG. 5, the tracking data generation means 14 includes an image data acquisition means 151, a lightweight data generation means 152, a lightweight data selection means 154, an image data selection means 153, a lightweight data storage means 155, and a tracking data output means 156.

The image data acquisition means 151 acquires first image data from the target detection means 13. Further, the image data acquisition means 151 acquires a first image data group from the image data storage means 12. Furthermore, the image data acquisition means 151 may collectively acquire image data constituting the first image data group, or may acquire the first image data group in a subdivided manner. Further, the image data acquisition means 151 may additionally acquire image data being accumulated in the image data storage means 12 as time elapses.

Out of the acquired image data, the image data acquisition means 151 outputs the first image data to the lightweight data generation means 152 and outputs the first image data group to the image data selection means 153.

The lightweight data generation means 152 sets a search window including a detection target 201 in first image data including the detection target 201 and generates lightweight data by characterizing information in the search window. In other words, the lightweight data generation means 152 generates lightweight data in which an amount of information is compressed, by characterizing image data in the search window.

For example, lightweight data are data for a recognition technology generated by Camshift processing. The Camshift processing extracts an area including a detection target 201, converts an image in the area into a color space, and generates a histogram related to the color space as lightweight data. Furthermore, lightweight data generated by the lightweight data generation means 152 may be generated by a method other than the Camshift processing.

Furthermore, the lightweight data generation means 152 inputs an image data group selected by the image data selection means 153 and generates lightweight data of a plurality of pieces of image data constituting the image data group.

The lightweight data generation means 152 outputs the generated lightweight data group to the lightweight data selection means 154. Note that the lightweight data generation means 152 will be described in detail later.

The image data selection means 153 inputs a first image data group from the image data acquisition means 151 and thins out a plurality of pieces of image data constituting the first image data group. In other words, the image data selection means 153 compresses the first image data group in a time direction. The image data selection means 153 may thin out lightweight data included in the first image data group at predetermined time intervals. Furthermore, the image data selection means 153 may thin out lightweight data included in the first image data group at random time intervals.

The image data selection means 153 outputs the image data group compressed in a time direction (hereinafter referred to a as second image data group) to the lightweight data generation means 152. Furthermore, instead of collectively outputting image data included in a second image data group to the lightweight data generation means 152, the image data selection means 153 may be set to output the image data at predetermined time intervals or at any timing.

The lightweight data selection means 154 inputs a lightweight data group (first lightweight data group) from the lightweight data generation means 152. Then, out of a plurality of pieces of lightweight data constituting the first lightweight data group, the lightweight data selection means 154 selects a data group (second lightweight data group) that can be used for recognizing a detection target 201. For example, the lightweight data selection means 154 selects lightweight data required for detecting the detection target 201, by aggregating or averaging lightweight data having a similar feature value, and forms a second lightweight data group.

The lightweight data selection means 154 tracks lightweight data included in a first lightweight data group in a time direction and selects lightweight data by which a detection target 201 can be recognized even when a change occurs in a direction, a posture, a position, or the like of the detection target. For example, the lightweight data selection means 154 may select characteristic lightweight data generated from image data including different directions, positions, and postures of the detection target 201.

The lightweight data selection means 154 causes the lightweight data storage means 155 to store the selected second lightweight data group.

The lightweight data storage means 155 stores a second lightweight data group selected by the lightweight data selection means 154.

The tracking data output means 156 acquires a second lightweight data group from the lightweight data storage means 155 and outputs data including the second lightweight data group to the tracking data transmission means 15 as tracking data. The tracking data output means 156 may output the input second lightweight data group to the tracking data transmission means 15 without processing, may add some data, may compress an amount of data to facilitate transmission, or the like.

(Lightweight Data Generation Means)

Figure 6:
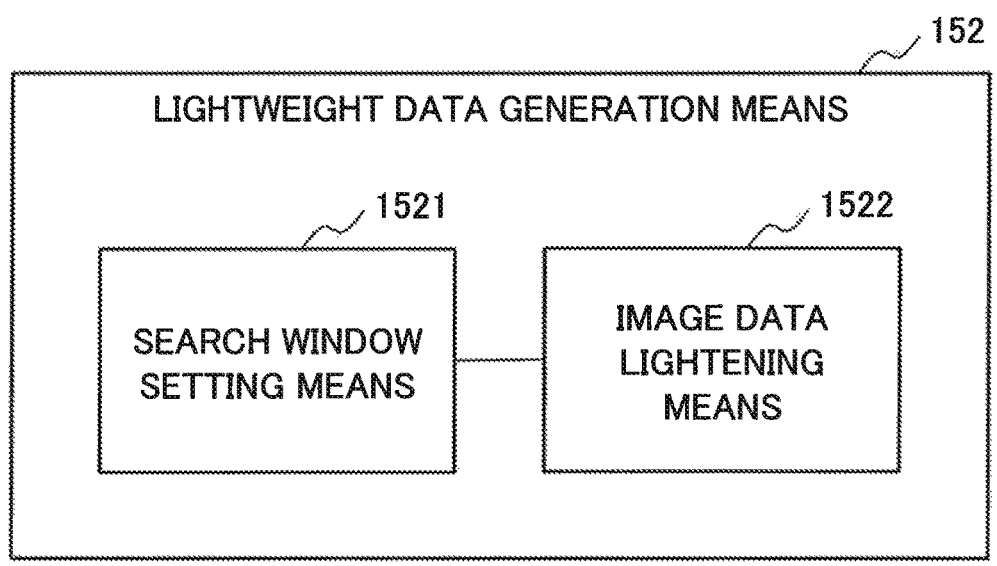
FIG. 6 is a block diagram illustrating a configuration of a lightweight data generation means included in the tracking data generation means included in the server device in the irradiation system according to the first example embodiment of the present invention.
Figure 7:
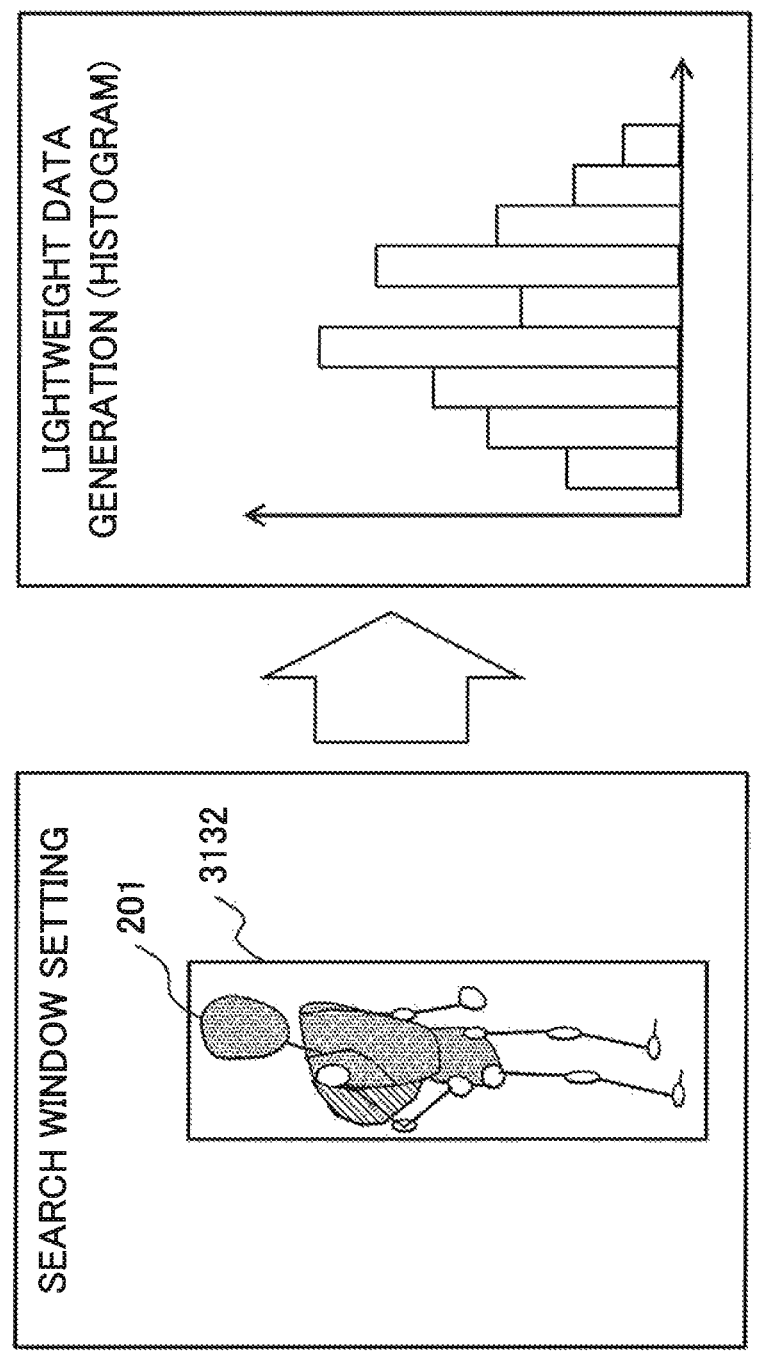
FIG. 7 is a conceptual diagram for illustrating a procedure of the irradiation system according to the first example embodiment of the present invention generating lightweight data.

Using FIGS. 6 and 7, generation of lightweight data will be described here. FIG. 6 is a configuration of the lightweight data generation means 152. FIG. 7 is a conceptual diagram of lightweight data generation processing. Note that the example in FIG. 6 is a configuration assuming the Camshift processing, and, when another type of data lightening processing is used, a different configuration may be employed.

As illustrated in FIG. 6, the lightweight data generation means 152 includes a search window setting means 1521 and an image data lightening means 1522.

The search window setting means 1521 sets a search window, based on a detection target 201 on image data. For example, as illustrated in FIG. 7, the search window setting means 1521 sets a search window 3132 in such a way that the search window 3132 surrounds an area around a detection target 201. Furthermore, a size of the search window 3132 represents a size of the detection target 201.

Furthermore, the search window setting means 1521 may set a reference point to a detection target 201 on image data. The reference point refers to a point being a reference for identifying the detection target 201. For example, the search window setting means 1521 may obtain a center point of the detection target 201 on the image data by the Meanshift processing. Furthermore, the search window setting means 1521 may set some point associated with the detection target 201 as a reference point.

The search window setting means 1521 extracts a search window 3132 from image data and outputs the extracted search window 3132 to the image data lightening means 1522.

The image data lightening means 1522 inputs a search window 3132 from the search window setting means 1521 and generates a histogram in the search window 3132. For example, the image data lightening means 1522 may divide the inside of the search window 3132 in a grid-like manner and generate histograms related to color information and brightness information in each grid. FIG. 7 illustrates a histogram as an example of lightweight data generated by the image data lightening means 1522.

Figure 8:
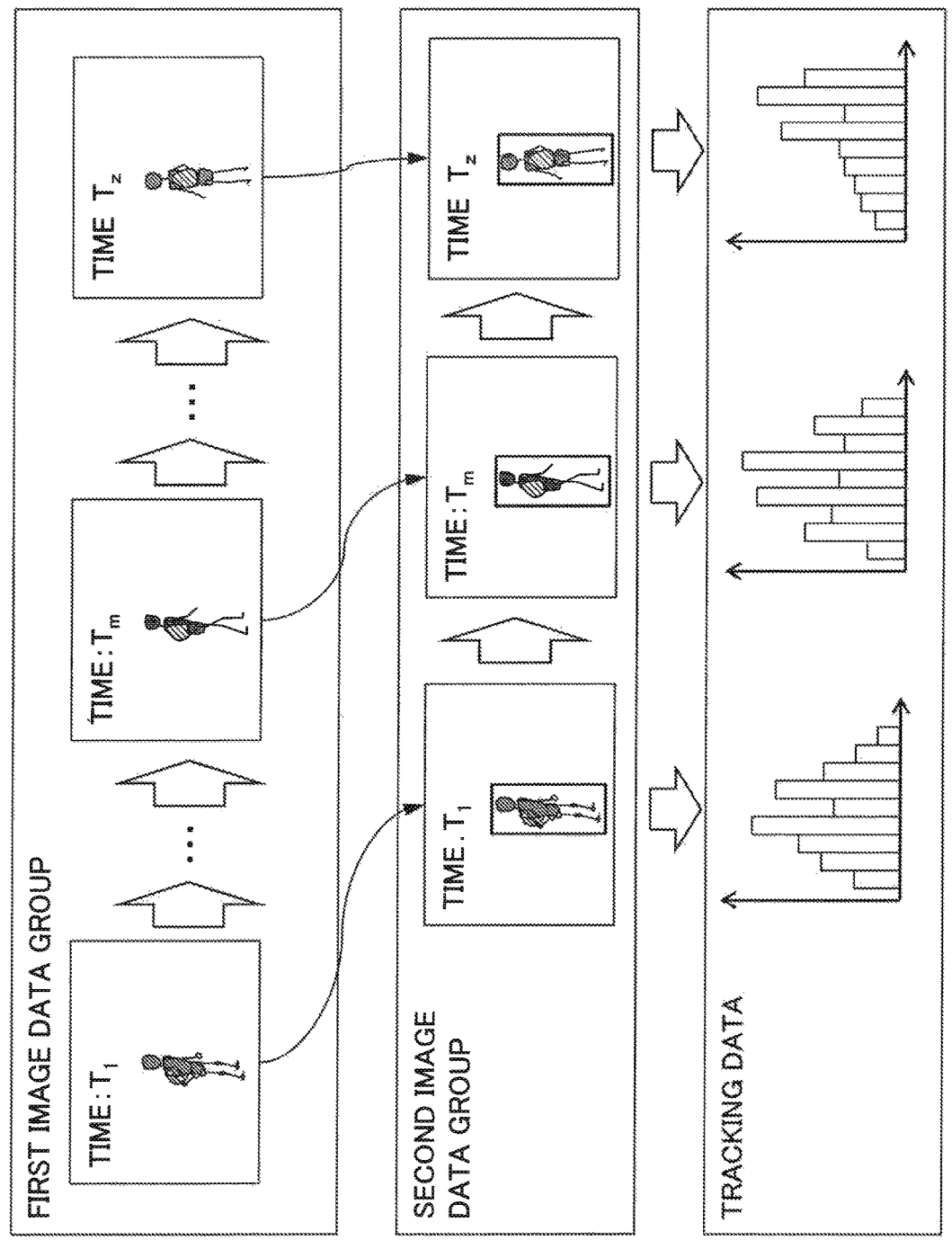
FIG. 8 is a conceptual diagram for illustrating processing of the irradiation system according to the first example embodiment of the present invention.

FIG. 8 illustrates an example for simply describing processing in the tracking data generation means 14.

The top row in FIG. 8 illustrates a plurality of pieces of image data (first image data group) captured at times $T_1, \ldots, T_m, \ldots, T_z$. Note that m and z are natural numbers and z is greater than m. Furthermore, while image data captured at the time $T_1$ or later is used in FIG. 8, image data captured before $T_1$ may be used.

The middle row in FIG. 8 illustrates a plurality of pieces of image data (second image data group) selected by the tracking data generation means 14. The tracking data generation means 14 selects the second image data group from the first image data group captured at the times $T_1$ to $T_z$ and sets a search window sized to surround a detection target.

The bottom row in FIG. 8 illustrates lightweight data (tracking data) generated from image data constituting the second image data group. The diagram illustrates that the tracking data generation means 14 generates a histogram in a set search window as lightweight data.

As illustrated in FIG. 8, after thinning out in a time direction a series of image data including image data in which the detection target is detected, the tracking data generation means 14 generates lightweight data of each piece of thinned out image data. Tracking data are obtained by putting the lightweight data generated by the tracking data generation means 14 together.

(Terminal Device)

Figure 9:
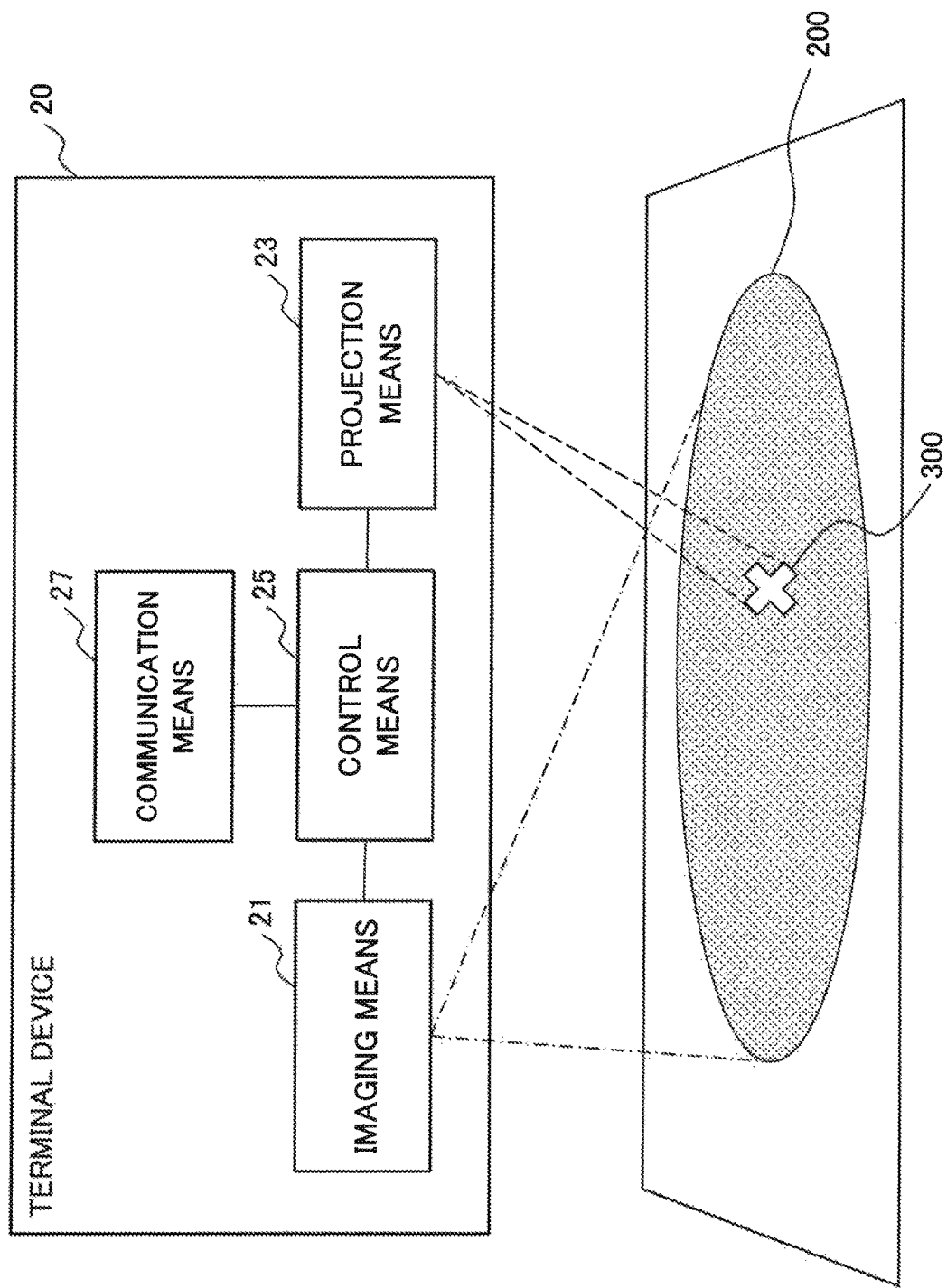
FIG. 9 is a block diagram illustrating a configuration of the terminal device in the irradiation system according to the first example embodiment of the present invention.

Next, using FIG. 9, a configuration of the terminal device 20 will be described in detail. As illustrated in FIG. 9, the terminal device 20 includes an imaging means 21, a projection means 23, a control means 25, and a communication means 27.

The imaging means 21 captures a monitored area 200 being a monitoring target. For example, the imaging means 21 may be provided by a function of a common camera. For example, the imaging means 21 may have a function of capturing light at a wavelength other than visible light such as infrared light or ultraviolet light. Further, for example, a function such as a depth sensor or a time-of-flight (TOF) camera may be included in the imaging means 21.

The projection means 23 has a function of a projector projecting marking light 300 on a detection target 201 in the monitored area 200 in accordance with control by the control means 25.

The control means 25 controls the entire terminal device 20. The control means 25 controls the imaging means 21 and causes the imaging means 21 to capture the monitored area 200. The control means 25 controls the projection means 25, based on tracking data received from the server device 10, and causes the projection means 25 to project the marking light 300 on the detection target 201. Further, the control means 25 performs control of capturing the monitored area 200 by the imaging means 21. For example, the control means 25 may be provided by a microcomputer including an arithmetic device, a control device, and the like.

The communication means 27 is a communication interface for exchanging data with the server device 10. The communication means 27 transmits image data output by the control means 25 to the server device 10 and receives tracking data transmitted by the terminal device 20.

(Imaging Means)

Figure 10:
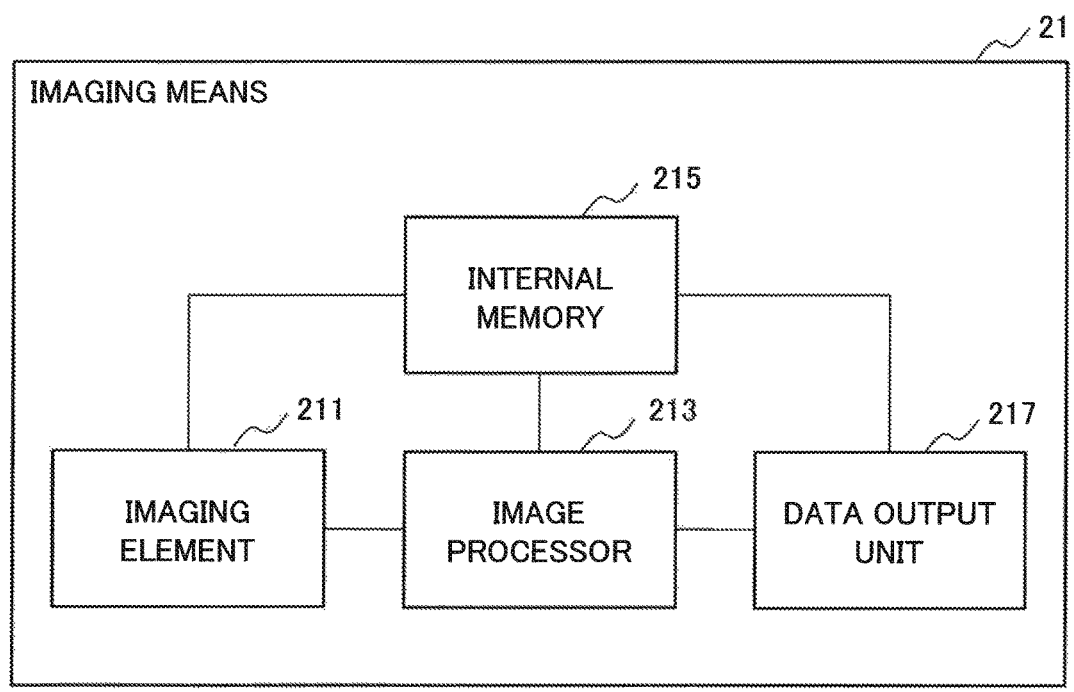
FIG. 10 is a block diagram illustrating a configuration of an imaging means included in the terminal device in the irradiation system according to the first example embodiment of the present invention.

Using FIG. 10, a detailed configuration of the imaging means 21 will be described here. As illustrated in FIG. 10, the imaging means 21 includes an imaging element 211, an image processor 213, an internal memory 215, and a data output unit 217.

The imaging element 211 is an element for capturing the monitored area 200 and acquiring image information. The imaging element 211 is a photoelectric conversion element on which semiconductor parts are integrated as an integration circuit. For example, the imaging element 211 may be provided by a solid-state imaging element such as a charge-coupled device (CCD) or a complementary metal-oxide-semiconductor (CMOS). While the imaging element 211 is normally composed of an element capturing light in the visible region, the imaging element 211 may be composed of an element capable of capturing/detecting electromagnetic waves such as infrared rays, ultraviolet rays, X-rays, gamma rays, a radio wave, and a microwave.

The image processor 213 is an integrated circuit performing image processing such as dark current correction, interpolation operation, color space conversion, gamma correction, aberration correction, noise reduction, and image compression on image information captured by the imaging element 211. Furthermore, when the image information is output without processing, the image processor 213 may be omitted. The image processor 213 may be provided by a processor designed for the terminal device 20 according to the present example embodiment to perform processing.

The internal memory 215 is a storage element temporarily storing image information that cannot be processed by the image processor 213 when performing image processing and processed image information. Furthermore, the internal memory 215 may be configured to temporarily store image information captured by the imaging element 211. The internal memory 215 may be composed of a common memory.

The data output unit 217 outputs image information processed by the image processor 213 to the control means 25.

(Projection Means)

Figure 11:
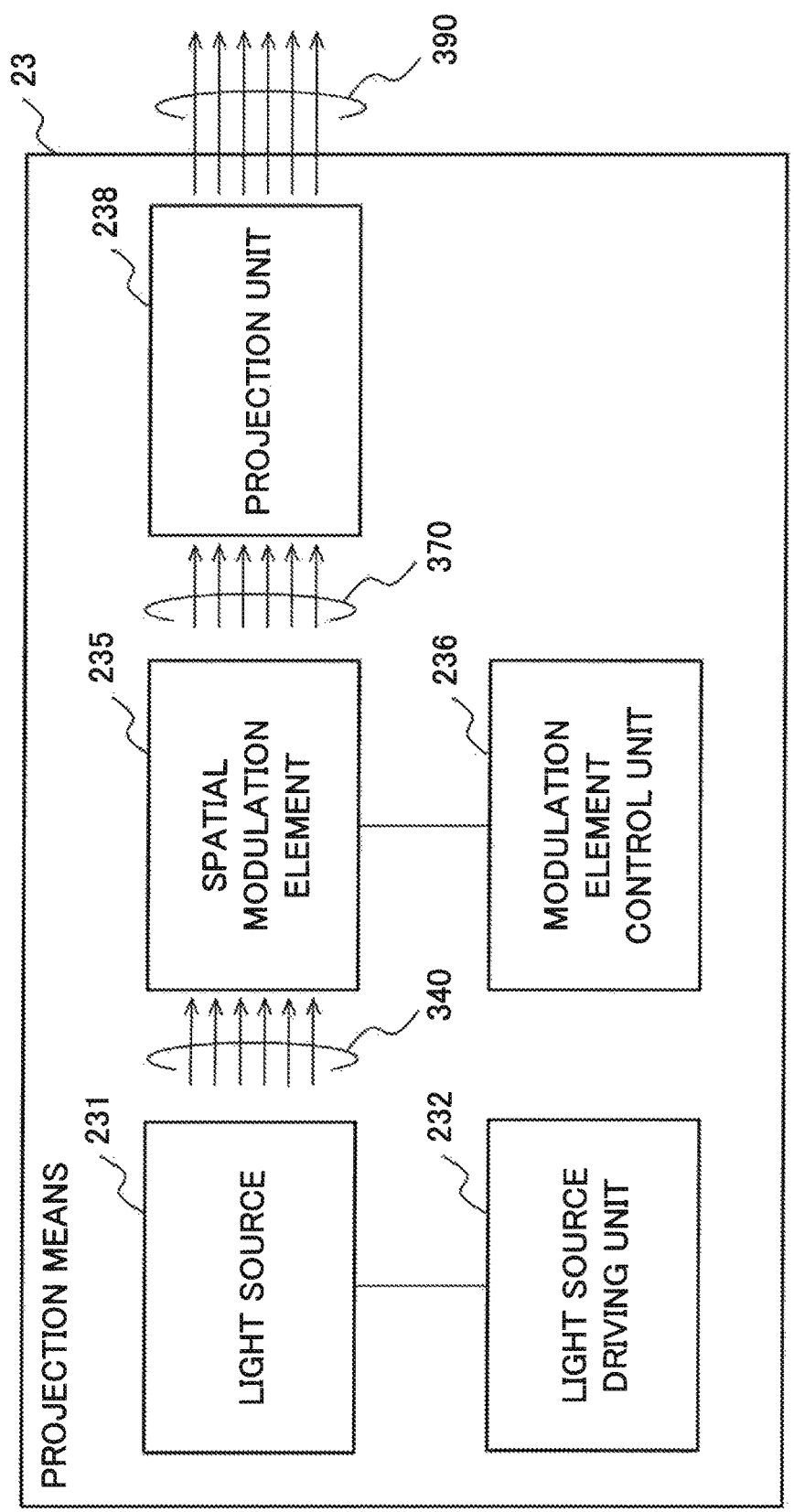
FIG. 11 is a block diagram illustrating a configuration of a projection means included in the terminal device in the irradiation system according to the first example embodiment of the present invention.
Figure 12:
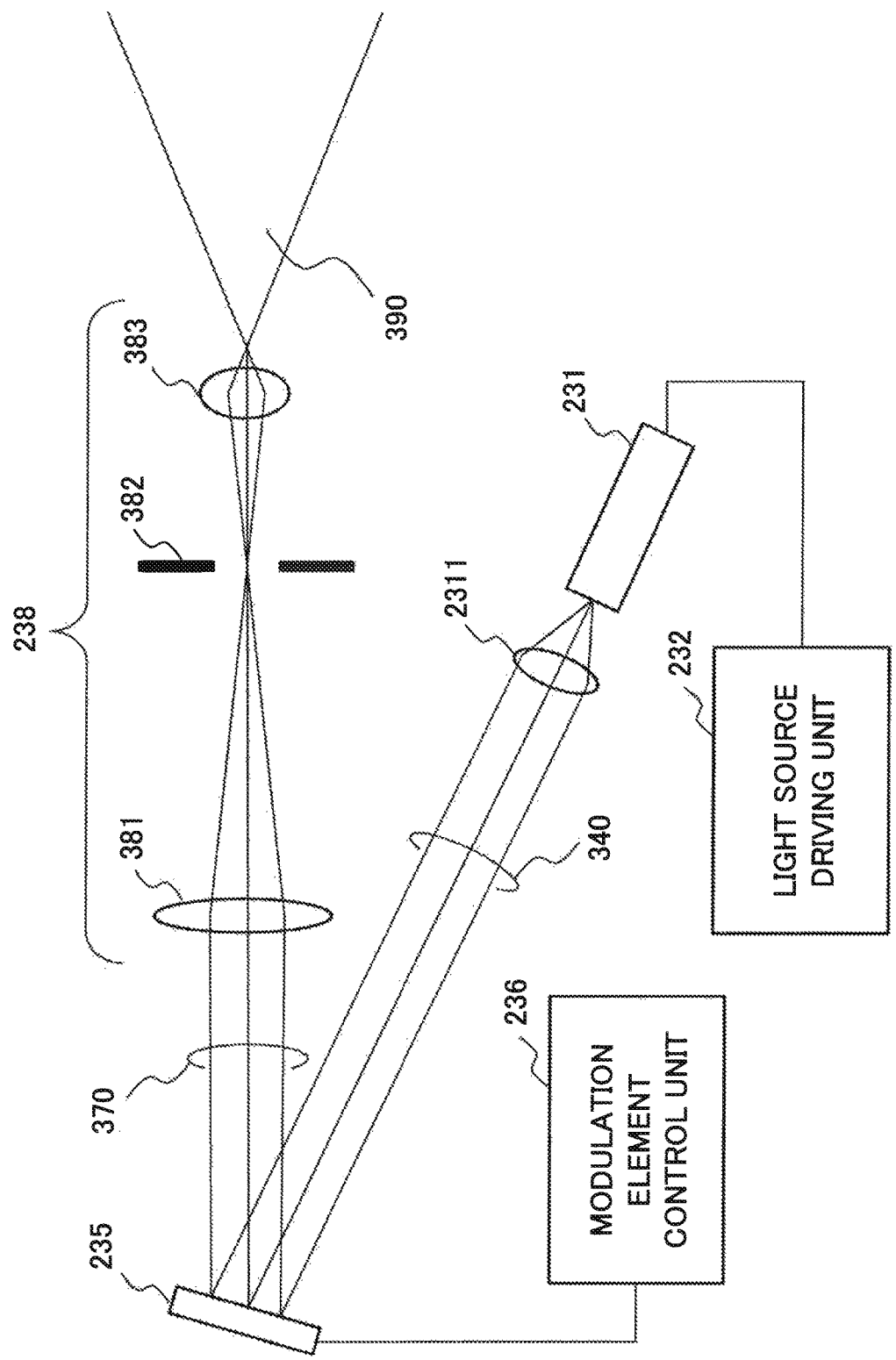
FIG. 12 is a block diagram illustrating an optical configuration of the projection means included in the terminal device in the irradiation system according to the first example embodiment of the present invention.

Using FIGS. 11 and 12, a detailed configuration of the projection means 23 will be described here. As illustrated in FIG. 11, the projection means 23 includes a light source 231, a light source driving unit 232, a spatial modulation element 235, a modulation element control unit 236, and a projection unit 238.

The light source 231 emits light 340 at a specific wavelength. Normally, the light source 231 is configured to emit light 340 in the visible region. Furthermore, the light source 231 may be configured to emit light 340 in a region other than the visible region such as the infrared region or the ultraviolet region. Light emitted by the light source 231 is turned to coherent light 340 through a collimator 2311 and is launched into a display unit in the spatial modulation element 235.

The light source driving unit 232 is a power source driving the light source 231 in accordance with control by the control means 25 and causes the light source 231 to emit the light 340. As illustrated in FIG. 12, the present example embodiment makes an incidence angle of the light 340 non-perpendicular to the display unit in the spatial modulation element 235. Specifically, the present example embodiment makes an emission axis of the light 340 emitted from the light source 231 diagonal to the display unit in the spatial modulation element 235. By setting the emission axis of the light 340 diagonal to the display unit in the spatial modulation element 235, the light 340 can be launched into the display unit in the spatial modulation element 235 without using a beam splitter, and therefore efficiency can be improved.

The spatial modulation element 235 displays on the local display unit a pattern for generating display information projected on a detection target 201, in accordance with control by the modulation element control unit 236. The marking light 300 corresponds to the display information, according to the present example embodiment.

For example, the spatial modulation element 235 may be provided by a phase modulation type spatial modulation element receiving incident coherent light 340 with an aligned phase and modulating the phase of the incident light 340. The spatial modulation element 235 emits toward the projection unit 238 modulated light 370 being modulated. Furthermore, the spatial modulation element 235 may be a type of element different from the phase modulation type, as long as display information can be projected on the monitored area 200

The display unit in the phase modulation type spatial modulation element 235 displays a phase distribution of display information projected on the monitored area 200. The modulated light 370 reflected by the display area in the spatial modulation element 235 becomes an image of a kind of diffraction gratings forming an aggregate, and the display information is formed by convergence of light diffracted by the diffraction gratings.

For example, the spatial modulation element 235 is provided by a spatial modulation element using a ferroelectric liquid crystal, a homogeneous liquid crystal, a homeotropic liquid crystal, or the like. Specifically, the spatial modulation element 235 can be provided by a liquid crystal on silicon (LCOS). Further, for example, the spatial modulation element 235 may be provided by a micro-electromechanical system (MEMS).

The modulation element control unit 236 causes the display unit in the spatial modulation element 235 to display a pattern for generating display information projected on the detection target 201. For example, the phase modulation type modulation element control unit 236 controls the spatial modulation element 235 in such a way that a parameter deciding a difference between a phase of the light 340 irradiated on the display unit in the spatial modulation element 235 and a phase of the modulated light 370 reflected on the display unit changes.

For example, parameters deciding a difference between a phase of the light 340 irradiated on the display unit in the phase modulation type spatial modulation element 235 and a phase of the modulated light 370 reflected on the display unit are parameters related to optical characteristics such as a refractive index and an optical path length. For example, the modulation element control unit 236 changes a refractive index of the display unit by controlling voltage applied to the display unit in the spatial modulation element 235. Consequently, the light 340 irradiated on the display unit is appropriately diffracted, based on the refractive index of the display unit. In other words, a phase distribution of the light 340 irradiated on the phase modulation type spatial modulation element 235 is modulated based on an optical characteristic of the display unit. Note that the control of the spatial modulation element 235 by the modulation element control unit 236 is not limited to the description above.

The projection unit 238 projects the light 340 emitted from the light source 231 as signal light 390. As illustrated in FIG. 12, the projection unit 238 includes a Fourier transform lens 381, an aperture 382, and a projection lens 383. The modulated light 370 modulated by the spatial modulation element 235 is projected on the detection target 201 by the projection unit 238 as the signal light 390. Furthermore, an image formed by the signal light 390 projected on the detection target 201 is the marking light 300.

The Fourier transform lens 381 is an optical lens for forming at a nearby focal position an image formed when the modulated light 370 reflected by the display unit in the spatial modulation element 235 is projected to infinity.

The aperture 382 has a function of eliminating higher order light included in light converged by the Fourier transform lens 381 and identifying an image area. An opening on the aperture 382 is formed smaller than the image area of display information at a position of the aperture 382 and is installed in such a way to block a peripheral area of the display information at the position of the aperture 382. For example, the opening on the aperture 382 is formed to be rectangular or circular. While it is preferable that the aperture 382 be installed at a focal position of the Fourier transform lens 381, the installed position may deviate from the focal position as long as a function of eliminating higher order light is exhibited.

The projection lens 383 is an optical lens magnifying and projecting light converged by the Fourier transform lens 381. The projection lens 383 projects the signal light 390 in such a way that display information related to a phase distribution input to the spatial modulation element 235 is displayed on the detection target 201. Furthermore, when the marking light 300 can be projected on the detection target 201 without the projection lens 383, the projection lens 383 may be omitted.

The signal light 390 projected from the projection unit 238 is not uniformly projected on a projection part but instead is intensively projected on parts constituting display information, such as a character, a symbol, and a frame. The projection means 23 according to the present example embodiment is used for a purpose of projecting a line drawing such as a simple symbol. In this case, an amount of irradiation of the light 340 can be practically decreased, and therefore a total optical output can be held down. Accordingly, the light source 231 can be configured with a small-sized and low-power light source and a low-powered light source driving unit driving the light source.

(Control Means)

Figure 13:
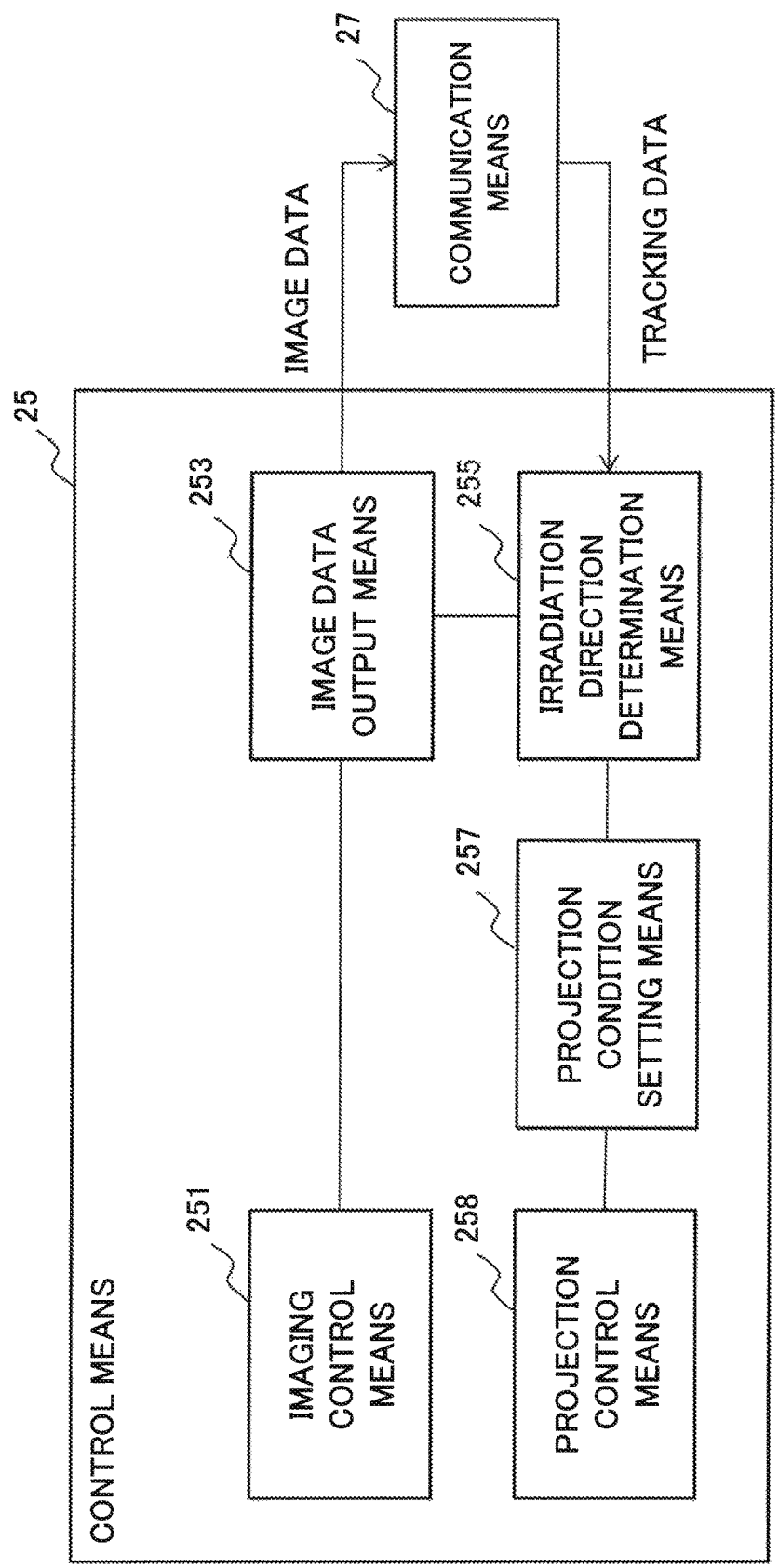
FIG. 13 is a block diagram illustrating a configuration of a control means included in the terminal device in the irradiation system according to the first example embodiment of the present invention.

Using FIG. 13, a detailed configuration of the control means 25 will be described here. As illustrated in FIG. 13, the control means 25 includes an imaging control means 251, an image data output means 253, an irradiation direction determination means 255, a projection condition setting means 257, and a projection control means 258.

The imaging control means 251 performs control of causing the imaging means 21 to capture the monitored area 200. The imaging control means 251 causes the imaging means 21 to capture the monitored area 200 at a predetermined timing. For example, the imaging control means 251 causes the imaging means 21 to capture the monitored area 200 at a predetermined timing such as 60 hertz.

For example, the imaging control means 251 may perform control in such a way to capture the monitored area 200 at constant intervals until detecting a detection target 201, and, at a stage when the marking light 300 is irradiated on the detection target 201, shorten the imaging cycle and capture a dynamic image of the detection target 201. Further, for example, the imaging control means 251 may perform control in such a way to capture a dynamic image of the monitored area 200 regardless of whether or not a detection target 201 is detected. Note that the imaging control by the imaging control means 251 is not limited to the description above.

The imaging control means 251 acquires image data output from the imaging means 21 and outputs the acquired image data to the image data output means 253.

The image data output means 253 outputs image data input from the imaging control means 251 to the communication means 27.

The irradiation direction determination means 255 inputs tracking data from the communication means 27 and inputs image data from the image data output means 253. The irradiation direction determination means 255 determines a direction in which the marking light 300 is irradiated, based on the tracking data. Details of the irradiation direction determination means 255 will be described later.

The projection condition setting means 257 sets a condition for projecting the marking light 300 in an irradiation direction determined by the irradiation direction determination means 255. The projection condition setting means 257 stores a pattern displayed on the display unit when projecting desired marking light 300 on the monitored area 200. The projection condition setting means 257 sets a condition for the desired marking light 300 to be projected in an irradiation direction determined by the irradiation direction determination means 255. For example, the projection condition setting means 257 sets a condition for the marking light 300 to be projected in a direction of the detection target 201 recognized on latest image data by using lightweight data.

The projection control means 258 controls the projection means 23 under a condition determined by the projection condition setting means 257.

(Irradiation Direction Determination Means)

Figure 14:
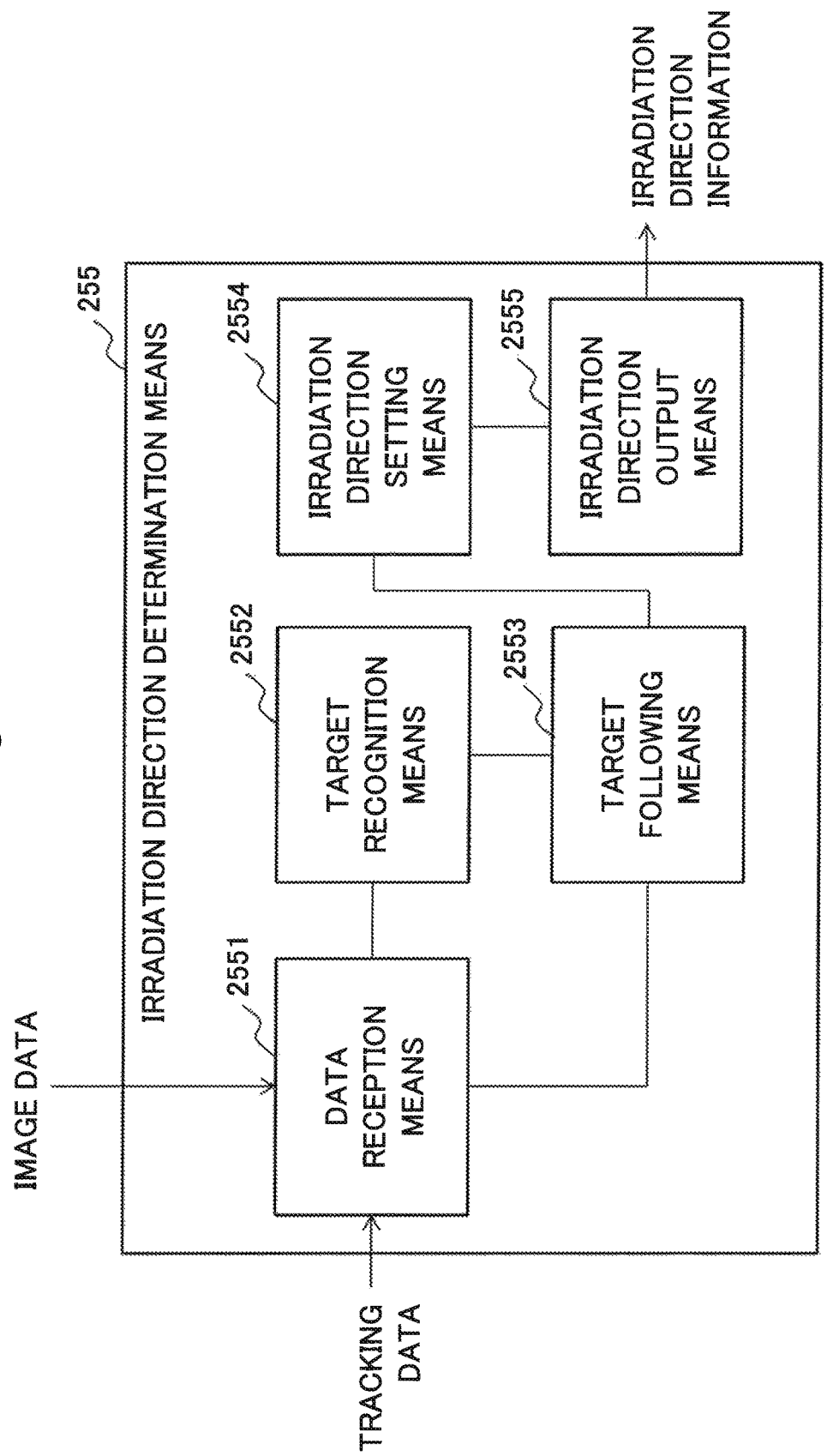
FIG. 14 is a block diagram illustrating a configuration of an irradiation position determination means included in the control means included in the terminal device in the irradiation system according to the first example embodiment of the present invention.

Using FIG. 14, a detailed configuration of the irradiation direction determination means 255 will be described here. As illustrated in FIG. 14, the irradiation direction determination means 255 includes a data reception means 2551, a target recognition means 2552, a target following means 2553, an irradiation direction setting means 2554, and an irradiation direction output means 2555.

The data reception means 2551 receives tracking data from the communication means 27. Further, the data reception means 2551 receives image data from the image data output means 253.

The data reception means 2551 outputs tracking data and image data to the target recognition means 2552. Further, the data reception means 2551 outputs image data to the target following means 2553.

The target recognition means 2552 receives tracking data and image data from the data reception means 2551 and recognizes a detection target 201 on the image data, based on the tracking data.

For example, the target recognition means 2552 sets on the image data an area (second search window) same as a search window (first search window) included in the tracking data and scans the second search window on the image data. The target recognition means 2552 generates lightweight data in the second search window (second lightweight data) and compares the second lightweight data with lightweight data included in the tracking data (first lightweight data). As a result of the comparison between the first lightweight data and the second lightweight data, the target recognition means 2552 decides presence or absence and a position of the detection target 201. For example, the target recognition means 2552 calculates a similarity level between the first lightweight data and the second lightweight data and, when the similarity level exceeds a predetermined decision criterion, decides that the detection target 201 exists at the position.

When deciding that the first and second lightweight data match, the target recognition means 2552 outputs the second lightweight data to the target following means 2553.

When the first and second lightweight data do not match, the target recognition means 2552 re-sets the second search window in such a way to scan around the second search window and generates second lightweight data in the re-set second search window. By comparing the newly generated second lightweight data with the first lightweight data, the target recognition means 2552 searches for an area in which the first and second lightweight data match. The target recognition means 2552 outputs second lightweight data decided to match the first lightweight data to the target following means 2553.

The target following means 2553 inputs image data from the data reception means 2551 and also inputs second lightweight data from the target recognition means 2552. The target following means 2553 sets a second search window on the image data and keeps the detection target 201 being included in the second search window. For example, the target following means 2553 may include a function similar to the tracking data generation means 14 and continue following the detection target 201, similarly to the tracking data generation means 14. Specifically, the target following means 2553 may keep the second search window changing in such a way to follow the detection target 201, by the Camshift processing.

The irradiation direction setting means 2554 sets an irradiation direction in which the marking light 300 is irradiated on the inside of a second search frame set on image data. For example, the irradiation direction setting means 2554 defines an XY plane coordinate system on the image data and sets an irradiation direction in which the marking light 300 is displayed on coordinates on the XY plane.

The irradiation direction setting means 2554 outputs the set irradiation direction information to the irradiation direction output means 2555.

The irradiation direction output means 2555 outputs irradiation direction information input from the irradiation direction setting means 2554 to the projection condition setting means 257.

The above describes the configuration of the irradiation system according to the present example embodiment.

(Operation)

Next, an operation of the irradiation system according to the present example embodiment will be described referring to flowcharts in FIGS. 15 to 18. Note that, in the examples in FIGS. 15 to 18, a case of using face authentication as authentication for detecting a detection target 201 will be described.

Figure 15:
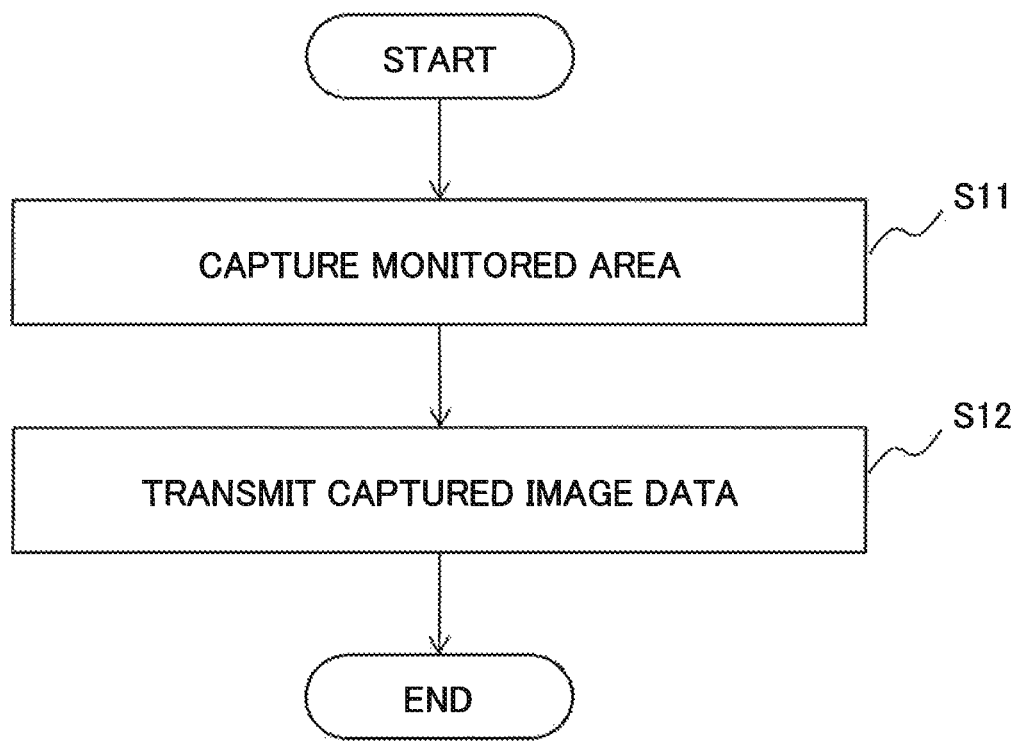
FIG. 15 is a flowchart for illustrating an operation of the imaging means included in the terminal device in the irradiation system according to the first example embodiment of the present invention.

FIG. 15 is a flowchart illustrating a flow of imaging processing by the imaging means 21 in the terminal device 20.

First, in FIG. 15, the imaging means 21 captures the monitored area 200 (Step S11).

The imaging means 21 outputs image data obtained by capturing the monitored area 200 to the control means 25 (Step S12).

The above describes the flow of the imaging processing by the imaging means 21 in the terminal device 20.

Figure 16:
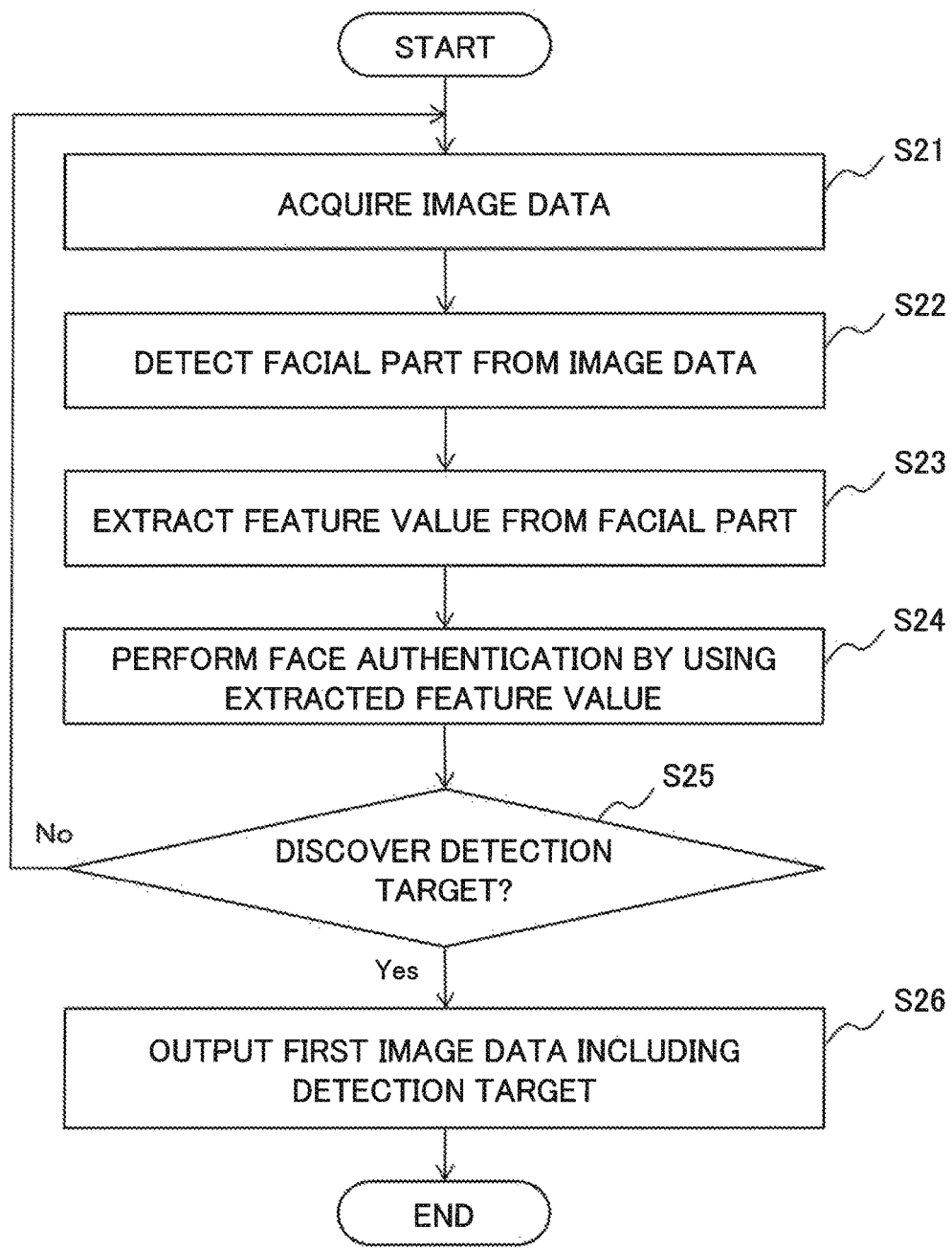
FIG. 16 is a flowchart for illustrating an operation of a target detection means included in the server device in the irradiation system according to the first example embodiment of the present invention.

FIG. 16 is a flowchart illustrating a flow of target detection processing by the target detection means 13 in the server device 10. The target detection processing in FIG. 16 is performed subsequent to the imaging processing in FIG. 15.

First, in FIG. 16, the target detection means 13 receives image data of the detection area 200 from the image data storage means 12 (Step S21).

The target detection means 13 detects a facial part from the received image data (Step S22).

The target detection means 13 extracts a feature value from the detected facial image (Step S23).

The target detection means 13 performs face authentication by using the extracted feature value (Step S24).

Figure 17:
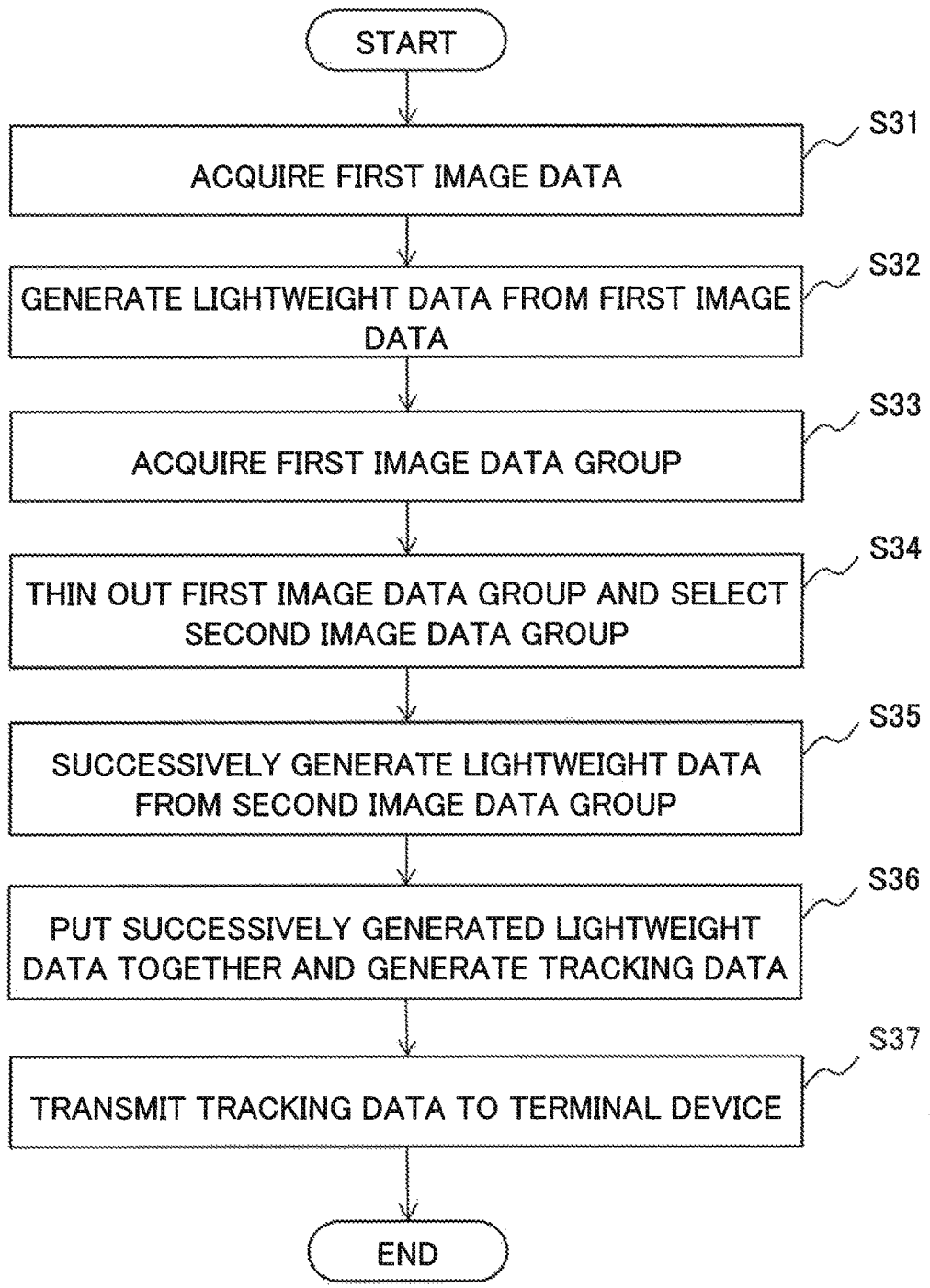
FIG. 17 is a flowchart for illustrating an operation of the target detection means included in the server device in the irradiation system according to the first example embodiment of the present invention.

When detecting a detection target 201 from the image data by the face authentication (Yes in Step S25), the target detection means 13 proceeds to tracking data generation processing in FIG. 17.

On the other hand, when a detection target 201 is not detected from the image data by the face authentication (No in Step S25), the target detection means 13 returns to Step S21.

The above describes the flow of the target detection processing by the target detection means 13 in the server device 10.

FIG. 17 is a flowchart illustrating a flow of the tracking data generation processing by the tracking data generation means 14 in the server device 10.

First, the tracking data generation means 14 acquires first image data in which the detection target 201 is detected by the target detection means 13 (Step S31).

The tracking data generation means 14 generates lightweight data from the image data in which the detection target 201 is detected by the target detection means 13 (Step S32).

The tracking data generation means 14 acquires a plurality of pieces of image data constituting a first image data group from the image data storage means 12 (Step S33).

The tracking data generation means 14 thins out frames in the first image data group and selects a plurality of pieces of image data constituting a second image data group (Step S34).

The tracking data generation means 14 successively generates lightweight data from the image data constituting the second image data group (Step S35).

The tracking data generation means 14 puts the successively generated tracking data together and generates tracking data (Step S36).

The tracking data generation means 14 transmits the generated tracking data to the terminal device 20 (Step S37).

The above describes the flow of the tracking data generation processing by the tracking data generation means 14 in the server device 10.

Figure 18:
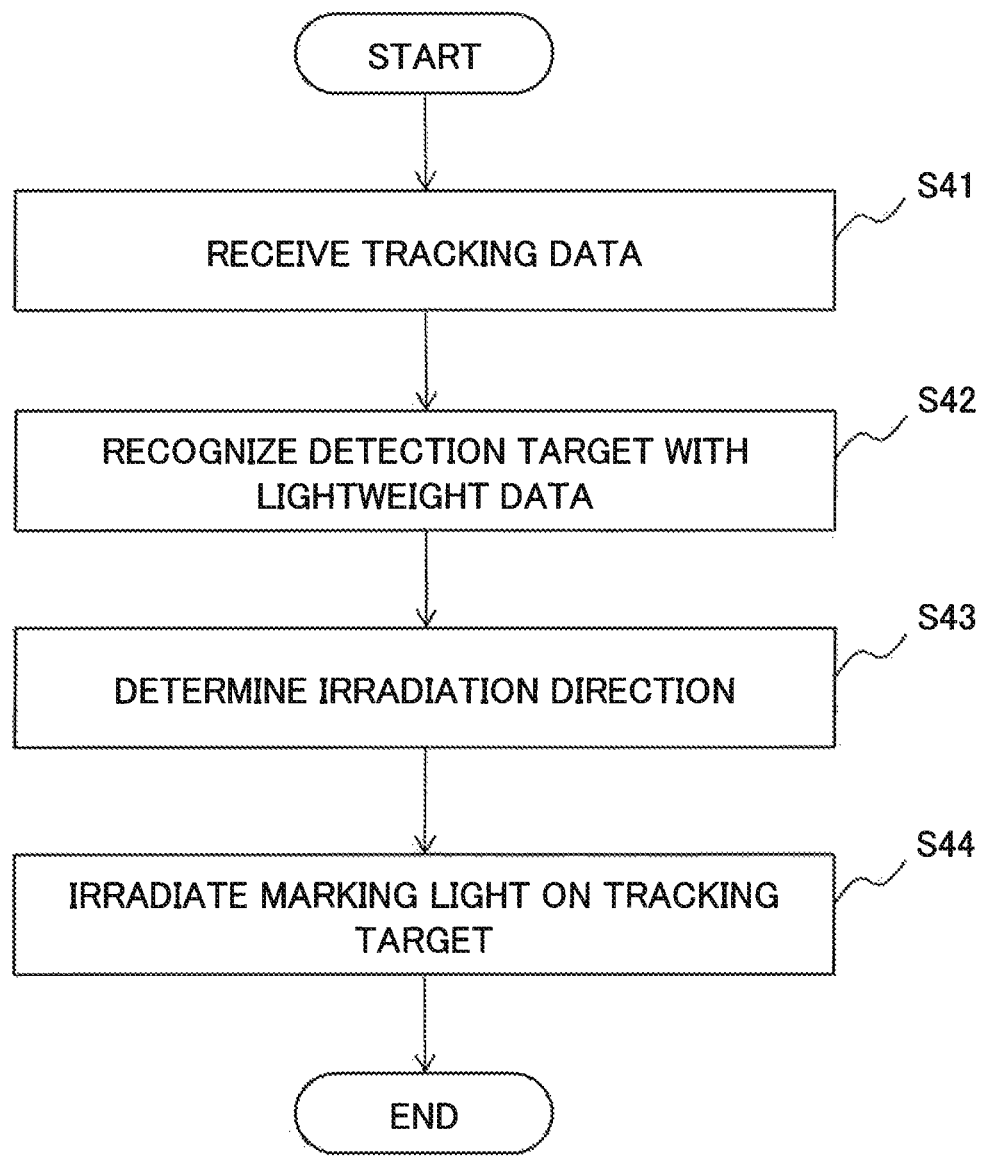
FIG. 18 is a flowchart for illustrating an operation of a data processing unit included in the terminal device in the irradiation system according to the first example embodiment of the present invention.

FIG. 18 is a flowchart illustrating a flow of projection control processing by the control means 23 in the terminal device 20.

First, in FIG. 18, the terminal device 20 receives tracking data from the server device 10 (Step S41).

The control means 25 recognizes a detection target 201 by using the lightweight data (Step S42).

The control means 25 determines an irradiation direction of the marking light 300 irradiated on the detection target 201 (Step S43).

The control means 25 controls the projection means 23 in such a way to irradiate the marking light 300 on the tracking target (Step S44).

The above describes the flow of the projection control processing by the control means 23 in the terminal device 20.

Figure 19:
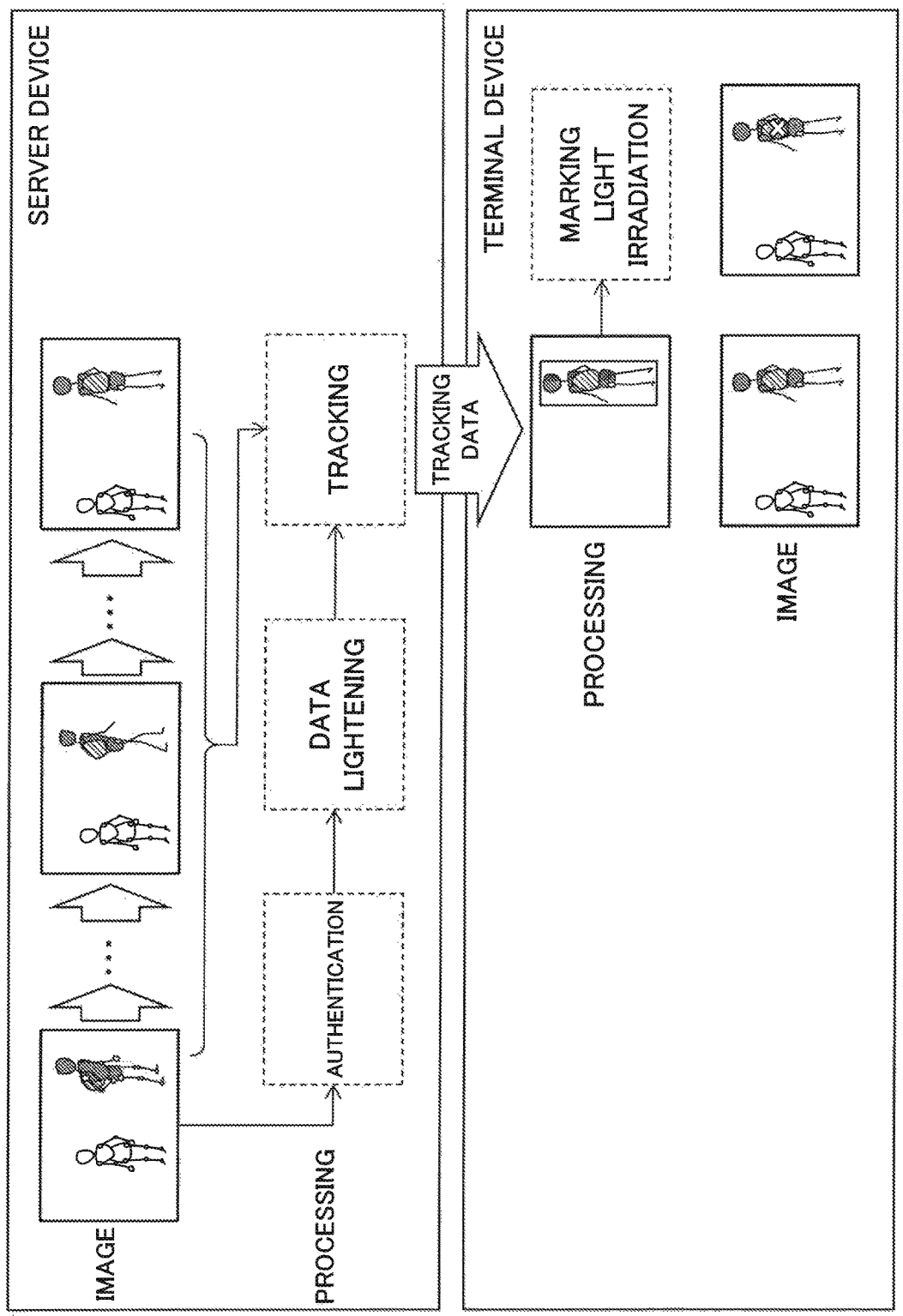
FIG. 19 is a conceptual diagram for illustrating a flow of a series of processing by the irradiation system according to the first example embodiment of the present invention.

FIG. 19 is a conceptual diagram temporally associating operations of the server device 10 and the terminal device 20 with one another, the server device 10 and the terminal device 20 constituting the irradiation system according to the present example embodiment. In FIG. 19, the flow of the operation of the server device 10 is illustrated in the upper frame and the flow of the operation of the terminal device 20 is illustrated in the lower frame, and time elapses from left to right in the diagram. Note that, in FIG. 19, a stage of transmitting image data from the terminal device 20 to the server device 10 is omitted.

The server device 10 sequentially acquires and accumulates image data of the monitored area 200. The server device 10 analyzes the image data at a predetermined timing. When detecting a detection target 201 in image data, the server device 10 generates lightweight data from the image data. Lightweight data generated from image data in which the detection target 201 is detected for the first time are herein referred to as first lightweight data. Further, it is assumed that lightweight data are successively generated with respect to image data captured after a time when the image data in which the detection target 201 is detected are captured.

Heavy authentication processing such as face authentication is performed at this stage, and therefore a time when original image data of the first lightweight data are captured deviates from a current time. Accordingly, a time when original image data of lightweight data successively generated subsequent to the first lightweight data are captured (hereinafter referred to as an original image data capture time) is also delayed from a current time. Accordingly, the server device 10 successively generates lightweight data after thinning out image data in such a way that a capture time of the image data gets closer to a current time, and generates lightweight data at a current time. In practice, lightweight data are generated from image data, and therefore a capture time of original image data does not match a current time. Accordingly, the server device 10 may transmit tracking data to the terminal device 20 at a stage when a difference between an original image data capture time and a current time reaches a predetermined time interval.

The terminal device 20 receives tracking data from the server device 10 and detects a detection target 201 on image data captured by the local device. When detecting a detection target 201, the terminal device 20 continues projecting the marking light 300 on the detection target 201 while tracking the detection target 201 with lightweight data.

In a system constructed with a common terminal and a common server, due to a delay in recognition processing or communication processing, a position of a target object may vary between a frame used for recognition and a current frame. Accordingly, there is a case that marking light cannot be exactly projected and displayed on the target object merely by positional information data.

The server device in the irradiation system according to the present example embodiment reduces a delay by converting heavy processing such as face authentication into light processing such as Camshift, and secures high-speed processing. Then, the server device in the irradiation system according to the present example embodiment tracks a target person by performing thinning processing on frames and transmits an almost current shape of the target object to the terminal device. The terminal device receiving the information reliably grasps a position of the target object by performing processing such as the Camshift and is able to precisely project marking light on the target object.

Consequently, the present example embodiment is able to minimize influence of a delay in recognition processing or communication processing.

(Modified Example)

Figure 20:
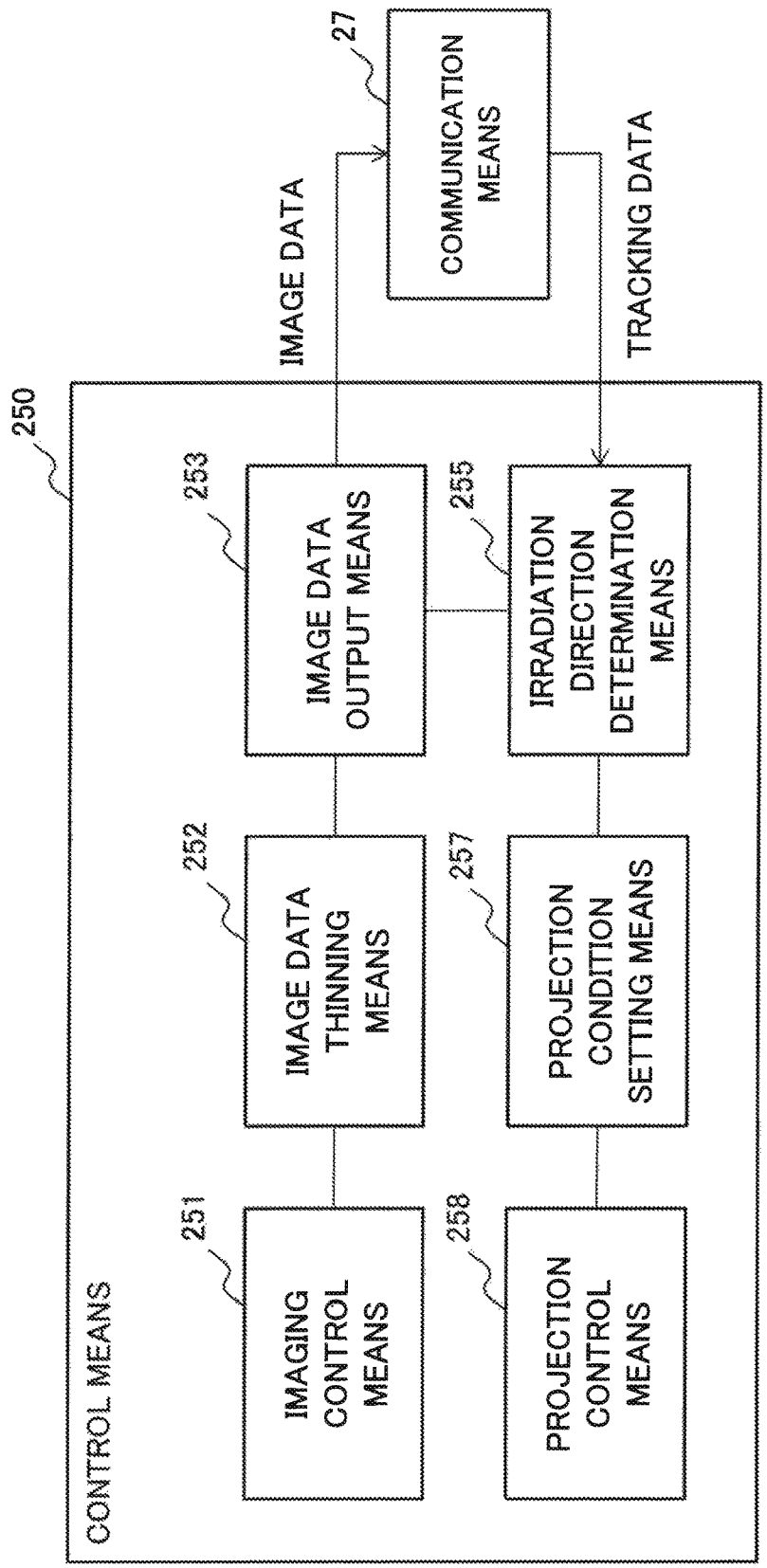
FIG. 20 is a block diagram illustrating a configuration of a modified example of the control means included in the terminal device in the irradiation system according to the first example embodiment of the present invention.

FIG. 20 is a block diagram illustrating a configuration of a control means 250 according to a modified example of the first example embodiment. The control means 250 has a configuration obtained by adding an image data thinning means 252 to the configuration of the control means 25 according to the first example embodiment. The configuration of the control means 250 other than the image data thinning means 252 is similar to that of the control means 25, and therefore description thereof is omitted.

The image data thinning means 252 acquires a series of image data captured by an imaging means 21 from an imaging control means 251 and thins out the series of image data in a time direction. For example, the image data thinning means 252 thins out the series of image data at predetermined intervals or at a predetermined timing. The image data thinning means 252 outputs a thinned out image data group to an image data output means 253.

The image data output means 253 outputs image data constituting an image data group thinned out by the image data thinning means 252 to a communication means 27.

Figure 21:
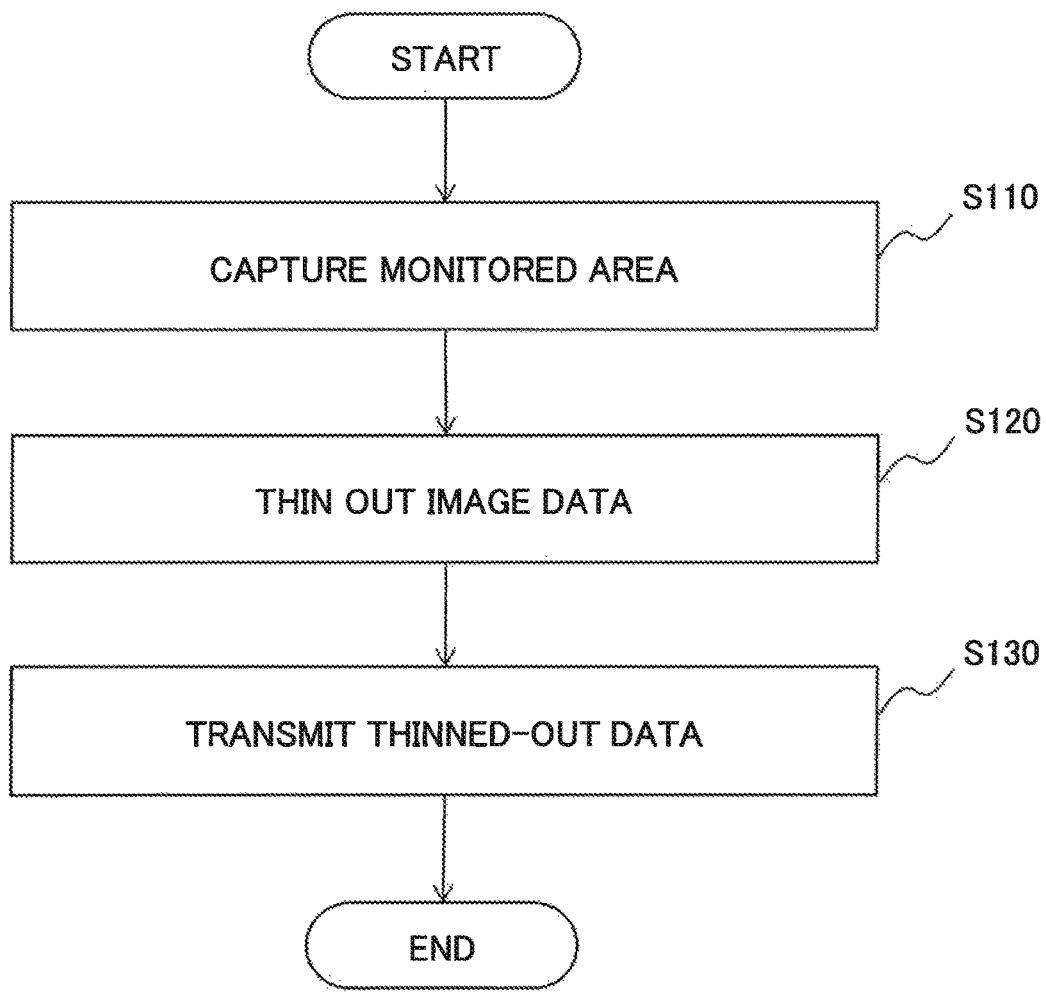
FIG. 21 is a flowchart for illustrating an operation of the imaging means included in the terminal device in the irradiation system according to the first example embodiment of the present invention.

FIG. 21 illustrates a flowchart illustrating a modified example of the flow of the imaging processing by the imaging means 21 in a terminal device 20. In the example in FIG. 21, captured image data are thinned out before being transmitted to a server device 10, unlike FIG. 15.

First, in FIG. 21, the imaging means 21 captures a monitored area 200 (Step S110).

The imaging means 21 thins out image data obtained by capturing the monitored area 200 on a time-series basis (Step S120).

The imaging means 21 transmits the thinned out image data to the server device 10 (Step S130).

The above describes the modified example of the first example embodiment.

(Second Example Embodiment)

Next, an irradiation system according to a second example embodiment of the present invention will be described referring to drawings. The irradiation system according to the present example embodiment differs from the first example embodiment in using image data captured by a surveillance camera in place of a terminal device.

Figure 22:
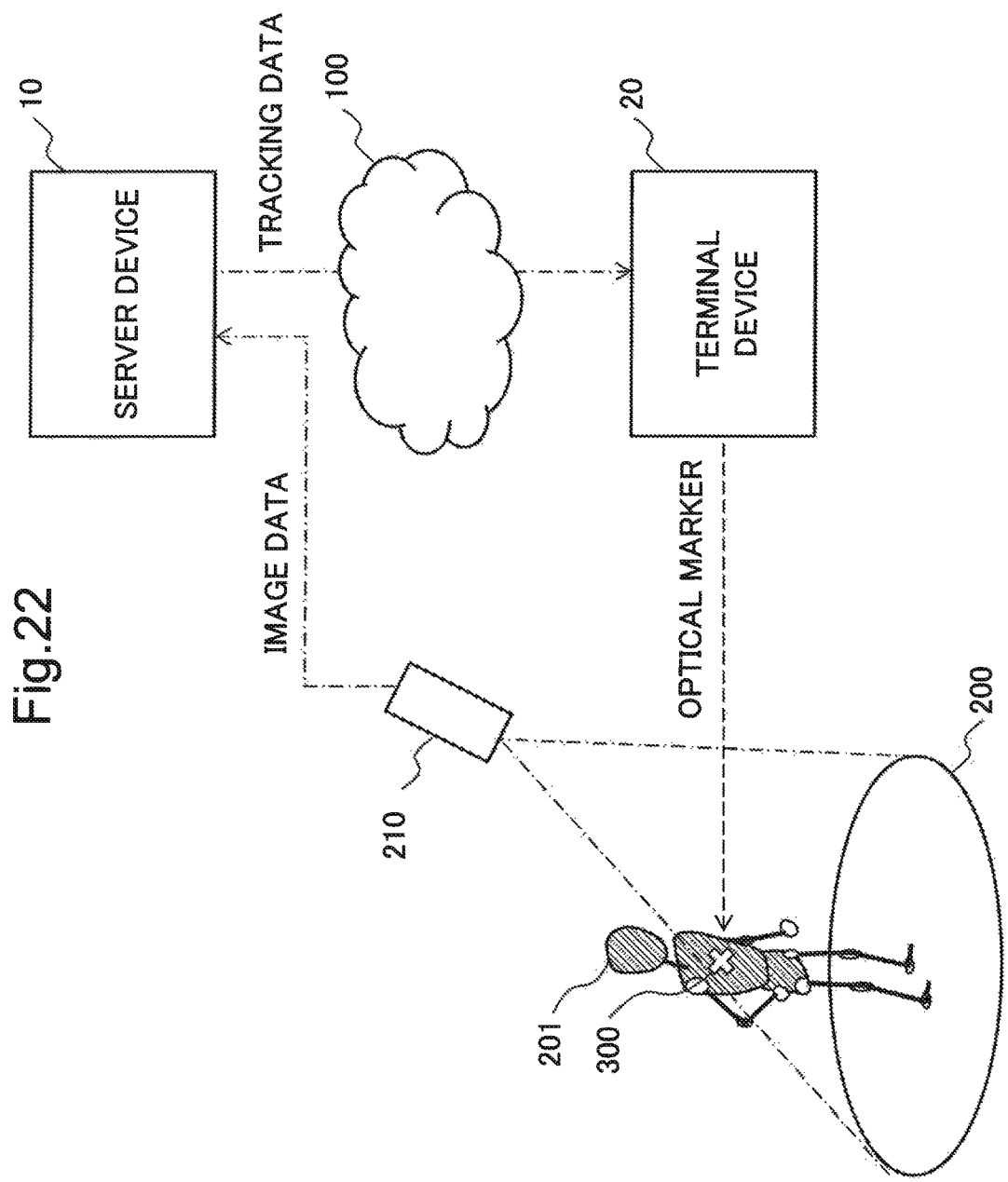
FIG. 22 is a conceptual diagram illustrating a configuration of an irradiation system according to a second example embodiment of the present invention.

As illustrated in FIG. 22, the irradiation system according to the present example embodiment performs authentication of a detection target 201 by using image data of a monitored area 200 captured by a surveillance camera 210 different from an imaging means 21 in a terminal device 20. The remaining configuration is similar to that of the irradiation system according to the first example embodiment, and therefore detailed description thereof is omitted.

Figure 23:
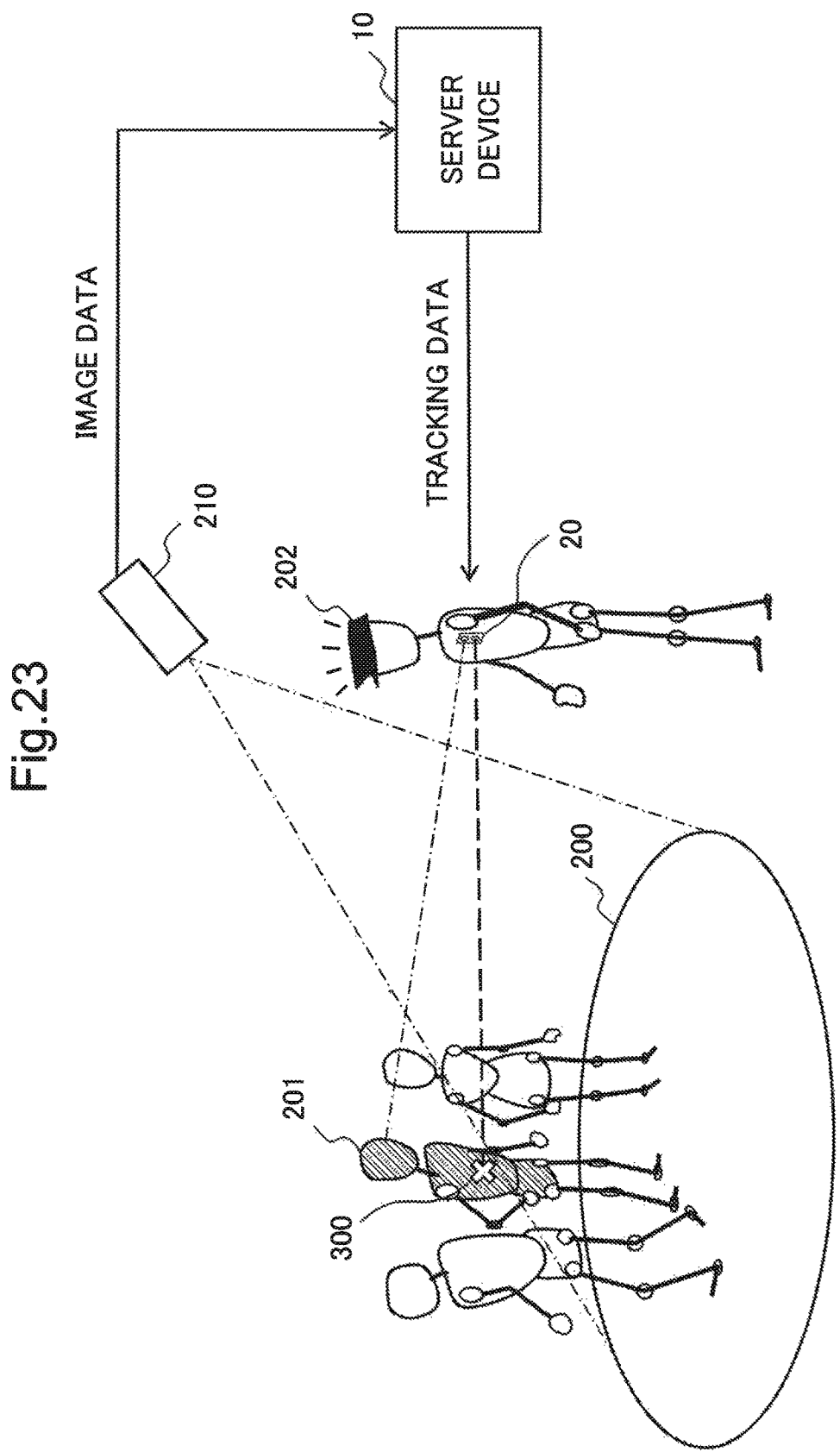
FIG. 23 is a conceptual diagram illustrating a use scene of the irradiation system according to the second example embodiment of the present invention.

FIG. 23 is an example of configuring the terminal device 20 as a wearable terminal attached to the chest or the like of a detector 202. Receiving tracking data from a server device 10, the terminal device 20 detects a detection target 201, based on the tracking data, and irradiates marking light 300 on the detection target 201.

As described above, a surveillance camera different from the terminal device acquires image data of the monitored area and transmits the image data to the server device, according to the present example embodiment. Accordingly, a delay in transmission of image data from the terminal device to the server device can be replaced by a delay in transmission of the image data from the surveillance camera to the server device. When the terminal device is configured as a wearable terminal, a limitation may be imposed on a data communication capacity for downsizing of the terminal device. On the other hand, the surveillance camera frequently remains stationary on a ceiling or the like, and therefore there is no need to impose a limitation on the data communication capacity depending on a size of the device. Accordingly, a delay in reception of image data of the monitored area by the server device is reduced.

Further, a camera built into the terminal device may not always be able to clearly capture faces of people in the monitored area even when being equipped with a camera shake prevention function or the like. By contrast, a stationary-type surveillance camera captures the monitored area, according to the present example embodiment, and therefore quality of image data is improved. It is easy to raise a frame rate and image quality of the surveillance camera compared with the camera built into the terminal device. Accordingly, image processing such as smoothing in authentication processing of a detection target can be reduced, and a delay in the authentication processing can be reduced.

Furthermore, the terminal device does not need to transmit image data capturing the monitored area to the server device in the configuration according to the present example embodiment, and therefore a transmission capacity of the terminal device can be reduced. Accordingly, a capacity of a communication function of the terminal device can be reduced.

(Third Example Embodiment)

Next, an irradiation system according to a third example embodiment of the present invention will be described referring to drawings. The irradiation system according to the present example embodiment includes a direction indication means indicating a direction of a detection target deviating from an angle of view of an imaging means. Furthermore, it is assumed that a configuration according to the present example embodiment is obtained by adding the direction indication means to the irradiation system according to the first or second example embodiment. Further, a server device is given a reference sign 10-3, and a terminal device is given a reference sign 20-3 in the description of the present example embodiment.

Figure 24:
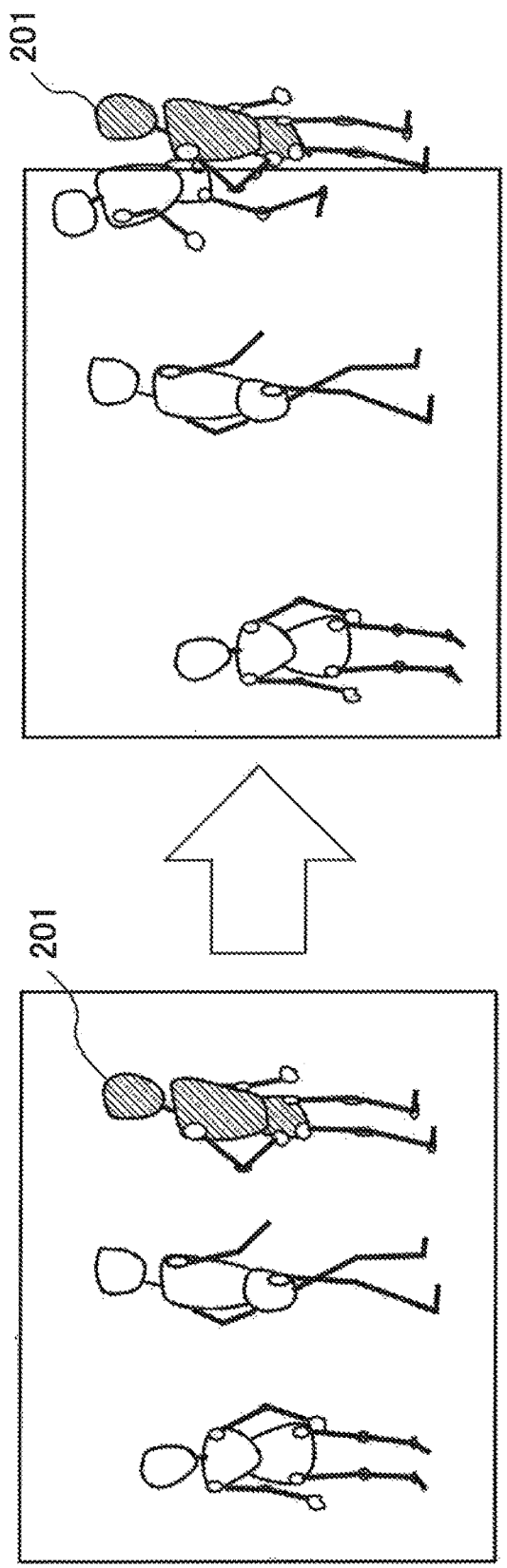
FIG. 24 is a conceptual diagram illustrating an example of a detection target going out of frame from an angle of view captured by the irradiation system according to the second example embodiment of the present invention.

FIG. 24 illustrates an example of a detection target 201 moving out of a monitored area 200 and going out of frame. It is assumed in FIG. 24 that the left side represents a start point of authentication processing, and the right side represents an end point of the authentication processing. When receiving tracking data at a stage when the detection target 201 goes out of frame as illustrated in FIG. 24, the terminal device 20 according to the second example embodiment is not able to recognize the detection target 201, based on the tracking data. Accordingly, a direction indication function indicating a direction in which the detection target 201 is positioned is added to the terminal device 20-3 according to the present example embodiment.

(Terminal Device)

Figure 25:
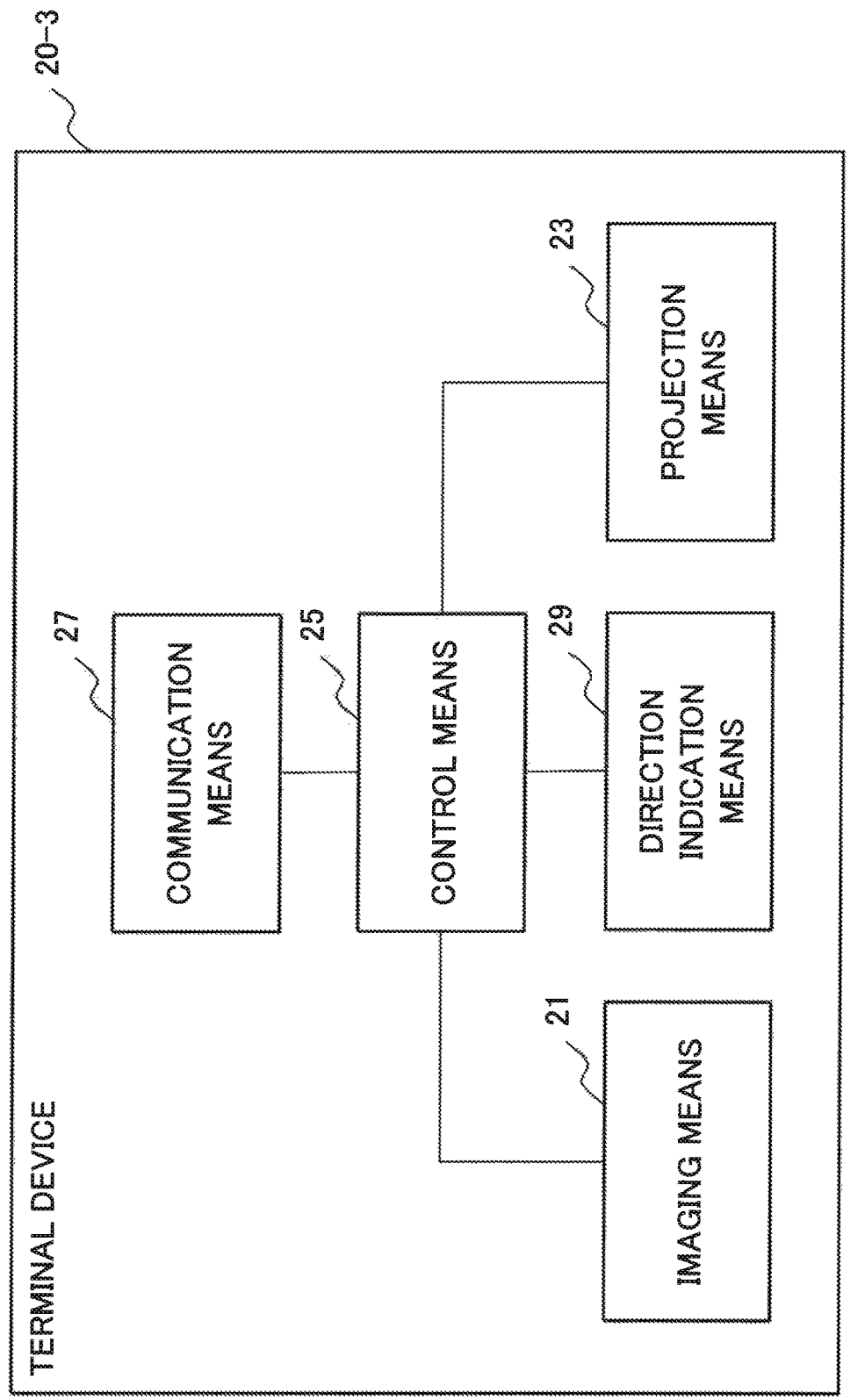
FIG. 25 is a block diagram illustrating a configuration of a terminal device in an irradiation system according to a third example embodiment of the present invention.

Next, using FIG. 25, a configuration of the terminal device 20-3 according to the present example embodiment will be described in detail. As illustrated in FIG. 25, the terminal device 20-3 includes a direction indication means 29 in addition to an imaging means 21, a projection means 23, a control means 25, and a communication means 27. Note that functions of the imaging means 21, the projection means 23, and the control means 25 are similar to those according to the second example embodiment, and therefore description thereof is omitted.

The direction indication means 29 indicates a direction in which a detection target 201 is positioned, based on direction indication information generated based on direction information of the detection target 201 included in tracking data transmitted from the server device 10-3.

Figure 26:
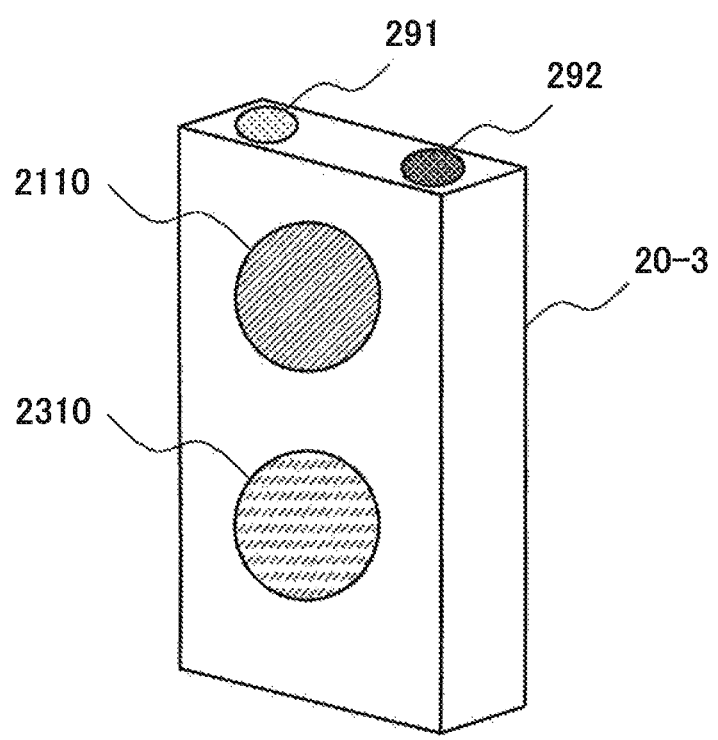
FIG. 26 is a conceptual diagram illustrating an example of the terminal device in the irradiation system according to the third example embodiment of the present invention.

FIG. 26 is an example of the terminal device 20-3 including the direction indication means 29. The terminal device 20-3 in FIG. 26 is equipped with direction indicators 291 and 292 indicating a direction in which the detection target 201 is positioned.

In the example in FIG. 26, when the detection target 201 is out of frame to the right, the direction indicator 291 is lit, and when the detection target 201 is out of frame to the left, the direction indicator 292 is lit. For example, the leftward and rightward directions may be indicated by different colors such as green for the direction indicator 291 and red for the direction indicator 292. Further, while indication of the leftward and rightward directions is normally sufficient, direction indicators indicating the upward and downward directions and the rearward direction may be equipped on the terminal device 20-3 in some cases.

Figure 27:
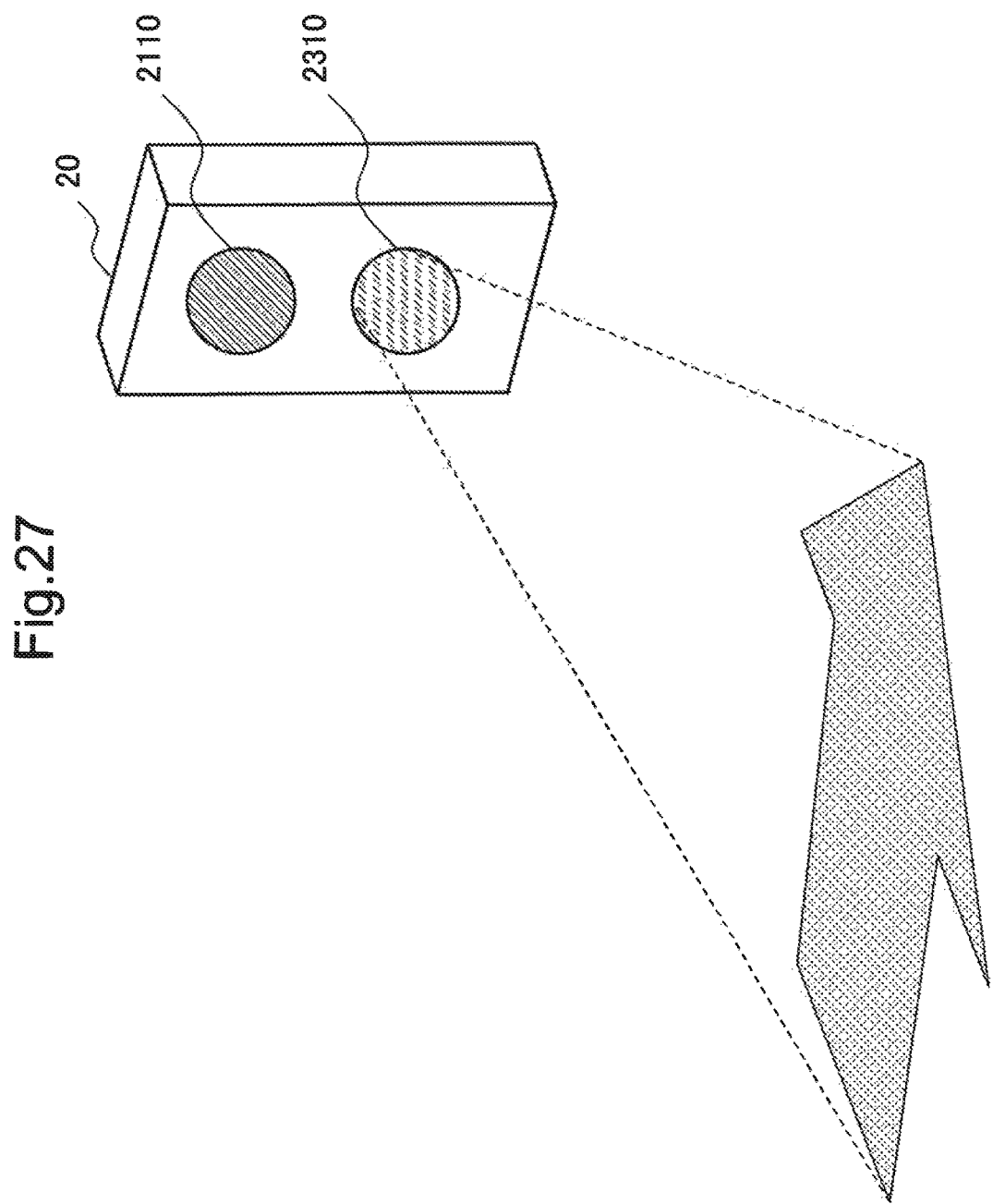
FIG. 27 is a conceptual diagram illustrating a modified example of the terminal device in the irradiation system according to the third example embodiment of the present invention.

Furthermore, as illustrated in FIG. 27, instead of being equipped with the direction indicators, the terminal device 20-3 may be configured to project display information indicating a direction of the detection target 201 from the projection means 23. In the example in FIG. 27, the direction indication means 29 may be omitted.

Next, an internal configuration of the terminal device 20-3 according to the present example embodiment will be described. The terminal device 20-3 differs from the second example embodiment in that an irradiation direction determination means 255-3 includes a target direction indication means 2556, and a control means 25-3 includes a direction indication control means 259.

Figure 28:
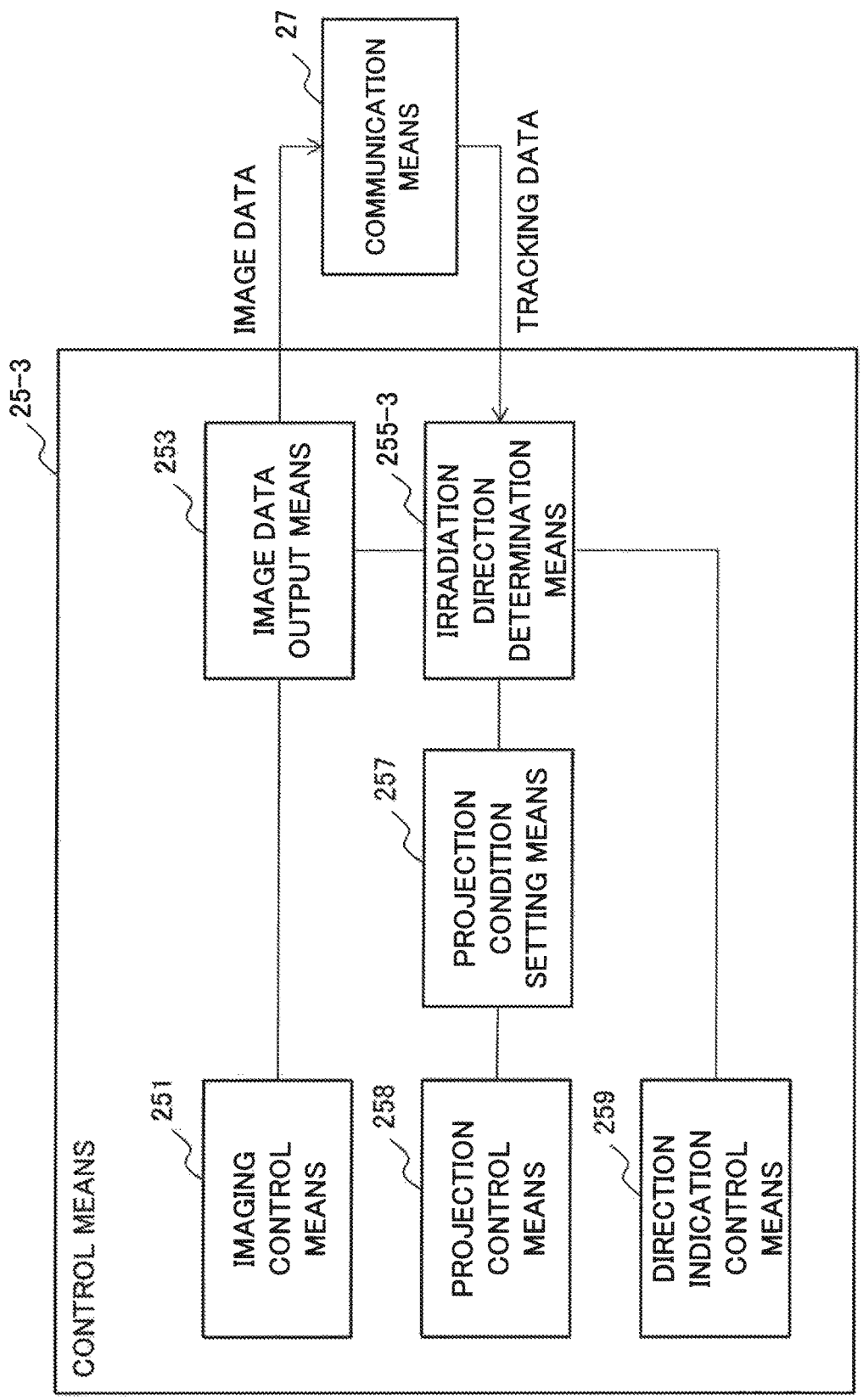
FIG. 28 is a block diagram illustrating a configuration of a control means included in the terminal device in the irradiation system according to the third example embodiment of the present invention.

As illustrated in FIG. 28, the control means 25-3 includes the direction indication control means 259 in addition to an imaging control means 251, an image data output means 253, an irradiation direction determination means 255-3, a projection condition setting means 257, and a projection control means 258. Note that the configuration other than the irradiation direction determination means 255-3 and the direction indication control means 259 is similar to that according to the first and second example embodiments, and therefore description thereof is omitted.

Figure 29:
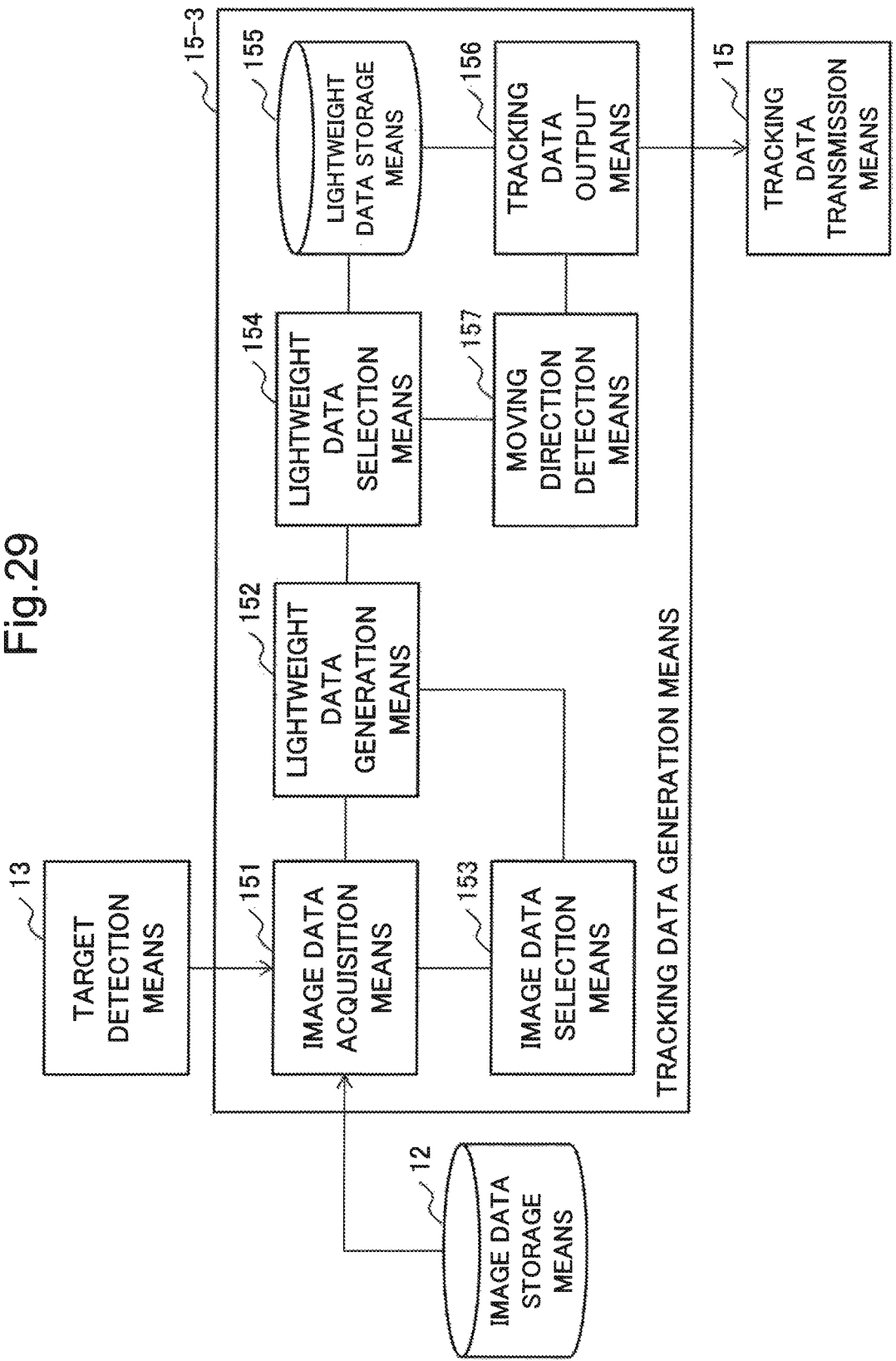
FIG. 29 is a block diagram illustrating a configuration of a tracking data generation means included in a server device in the irradiation system according to the third example embodiment of the present invention.

FIG. 29 is a block diagram illustrating a configuration of a tracking data generation means 15-3 included in the server device 10-3 according to the present example embodiment. The tracking data generation means 15-3 has a configuration obtained by adding a moving direction detection means 157 to the tracking data generation means 14 in the server device 10 according to the first example embodiment.

A lightweight data selection means 154 according to the present example embodiment successively outputs lightweight data changing moment by moment to the moving direction detection means 157.

The moving direction detection means 157 acquires a series of lightweight data on a time-series basis from the lightweight data selection means 154, inspects the series of lightweight data, and detects a moving direction of a detection target 201 on image data. For example, when Camshift processing is used, the moving direction detection means 157 detects a moving direction of the detection target 201 by a temporal change of a reference point such as a barycenter of a search frame 3132 surrounding the detection target 201.

The moving direction detection means 157 outputs a moving direction of the detected detection target 201 to a tracking data output means 156.

The tracking data output means 156 adds a moving direction of the detection target 201 to tracking data and outputs the resulting tracking data to the tracking data transmission means 15.

Figure 30:
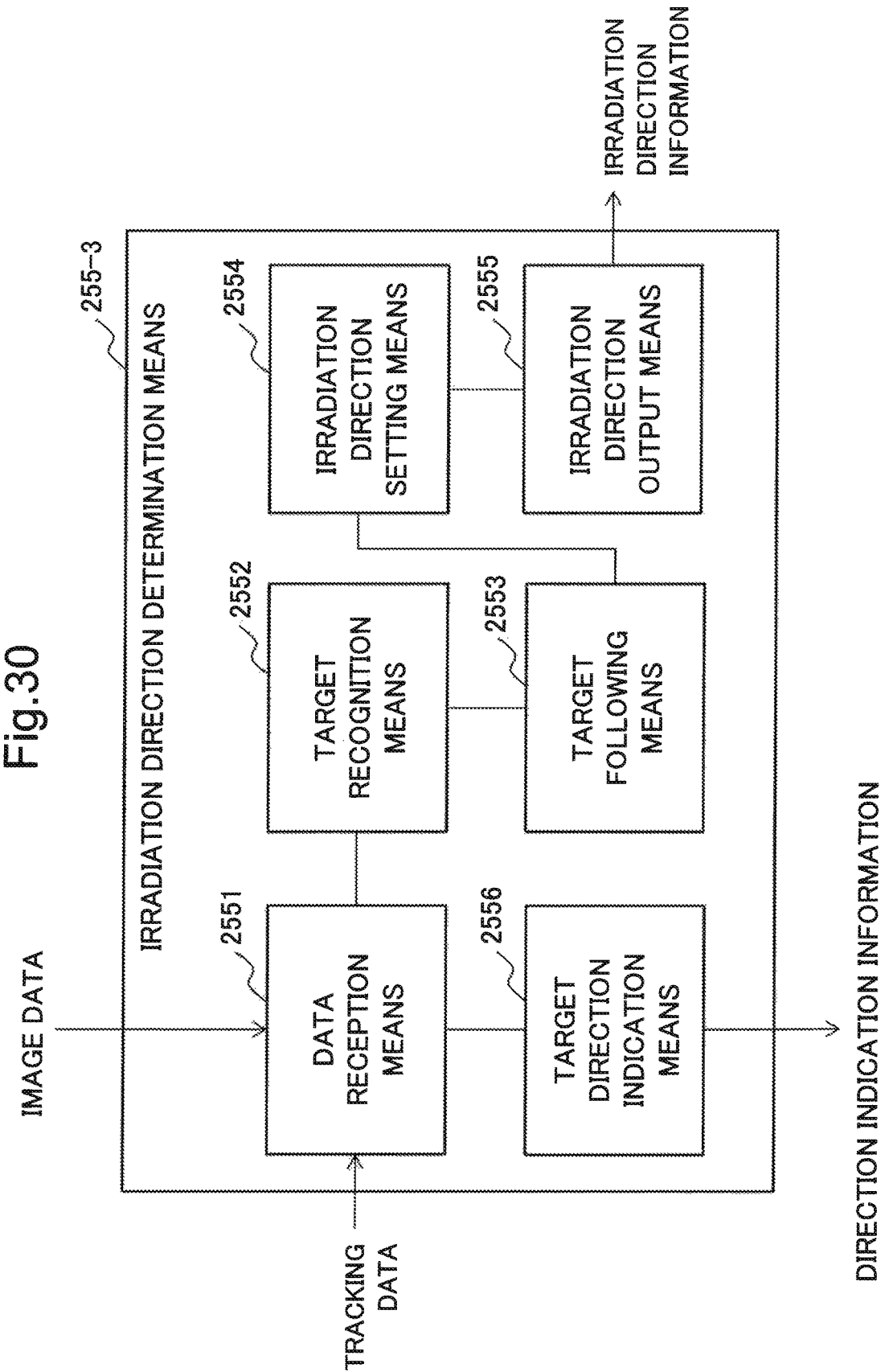
FIG. 30 is a block diagram illustrating a configuration of an irradiation position determination means included in the control means included in the terminal device in the irradiation system according to the third example embodiment of the present invention.

Further, as illustrated in FIG. 30, the irradiation direction determination means 255-3 includes a target direction indication means 2556 in addition to a data reception means 2551, a target recognition means 2552, a target following means 2553, an irradiation direction setting means 2554, and an irradiation direction output means 2555. Note that the configuration other than the target direction indication means 2556 is similar to that according to first and second example embodiments, and therefore description thereof is omitted.

When receiving tracking data, the data reception means 2551 outputs lightweight data generated from image data captured at the latest time out of a second lightweight data group included in the tracking data to the target recognition means 2552. Furthermore, the data reception means 2551 may output lightweight data generated from image data captured at a time close to the latest time to the target recognition means 2552, as long as the current detection target 201 can be recognized.

Further, the data reception means 2551 outputs direction information of the detection target 201 to the target direction indication means 2556.

When receiving direction information of the detection target 201, the target direction indication means 2556 generates direction indication information indicating a direction in which the detection target 201 is positioned, based on the direction information. For example, the target direction indication means 2556 may compare a range of the monitored area 200 captured by the terminal device 20-3 with the positional information of the detection target 201 and inspect in which of the leftward or rightward direction the imaging direction should be turned in such a way that the detection target 201 comes into an angle of view of the imaging means 21. Furthermore, the target direction indication means 2556 may be configured to generate direction indication information by using the direction information itself transmitted from the server device 10-3.

Based on the inspection result of in which direction the terminal device 20-3 should turn the imaging direction, the target direction indication means 2556 generates direction indication information including information about in which direction the imaging direction of the terminal device 20-3 should be changed. The target direction indication means 2556 outputs the generated direction indication information to the control means 25-3.

The direction indication control means 259 acquires direction indication information from the irradiation direction determination means 255-3. Based on the direction indication information, the direction indication control means 259 controls the direction indication means 29 in the terminal device 20-3. The direction indication control means 259 controls the direction indication means 29 in such a way that the direction indication means 29 indicates the leftward direction when the detection target 201 is out of frame to the left and indicates the rightward direction when the detection target 201 is out of frame to the right.

Figure 31:
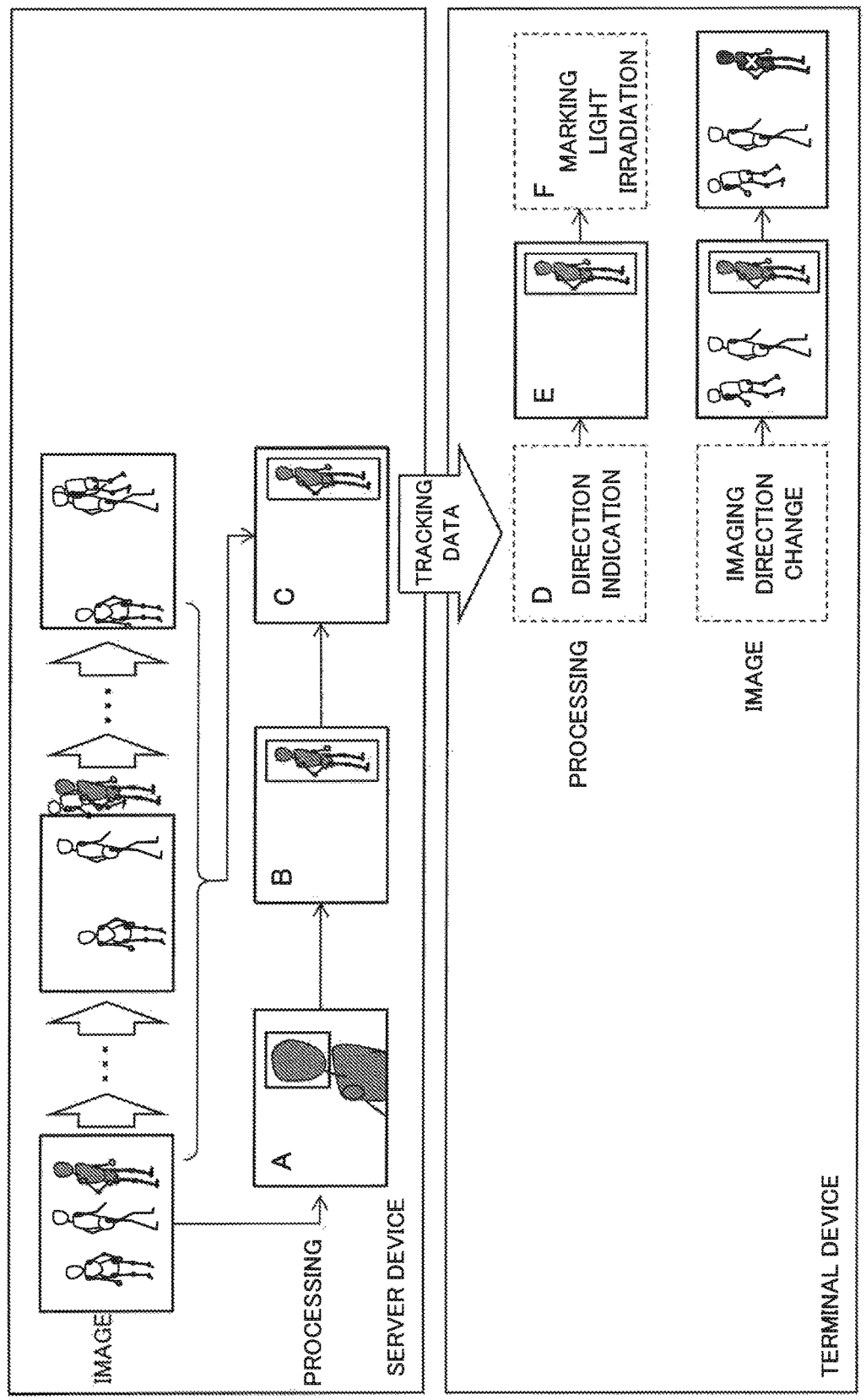
FIG. 31 is a conceptual diagram for illustrating a flow of a series of processing by the irradiation system according to the third example embodiment of the present invention.

FIG. 31 is a conceptual diagram associating operations of the server device 10-3 and the terminal device 20-3 with one another on a time-series basis, the server device 10-3 and the terminal device 20-3 constituting the irradiation system according to the present example embodiment. In FIG. 31, a flow of the operation of the server device 10-3 is illustrated in the upper frame, and a flow of the operation of the terminal device 20-3 is illustrated in the lower frame. Note that description of a part similar to the example in FIG. 19 in the example in FIG. 31 is omitted.

Also in the example in FIG. 31, the server device 10-3 sequentially acquires and accumulates image data of the monitored area 200.

The server device 10-3 generates tracking data obtained by including direction information of the detection target 201 in second lightweight data and transmits the tracking data to the terminal device 20-3.

The example in FIG. 31 differs from the example in FIG. 19 in that the terminal device 20-3 generates direction indication information, based on direction information included in tracking data and turns an imaging direction of the terminal device 20-3 depending on direction indication generated from the direction indication information. In the example in FIG. 31, the terminal device 20-3 operates similarly to the example in FIG. 19 after the imaging direction is turned to the detection target 201.

As described above, in the irradiation system according to the present example embodiment, a person attached with the terminal device (hereinafter referred to as a detector) is able to be aware of a direction in which a detection target is positioned, by a direction indicator or a direction indication image, when the detection target goes out of an angle of view of the camera during processing in the server device. When the detector turns the body to a direction based on the direction indicator or the direction indication image, and the detection target comes into the angle of view of the terminal device, the terminal device recognizes the detection target and irradiates marking light toward the detection target.

Further, in the irradiation system according to the present example embodiment, when the detection target is about to go out of the angle of view of the camera due to a processing delay, the server device is able to notify the person attached with the terminal device of a direction in which the detection target is likely to go out of frame, by transmitting direction indication information to the terminal device. Discovery of the detection target by the terminal device becomes easier by instructing the detector to turn the body to a proper direction. Consequently, the time required for a series of target recognition processing is shortened.

(Modified Example)

Next, a modified example of the irradiation system according to the third example embodiment will be described.

Figure 32:
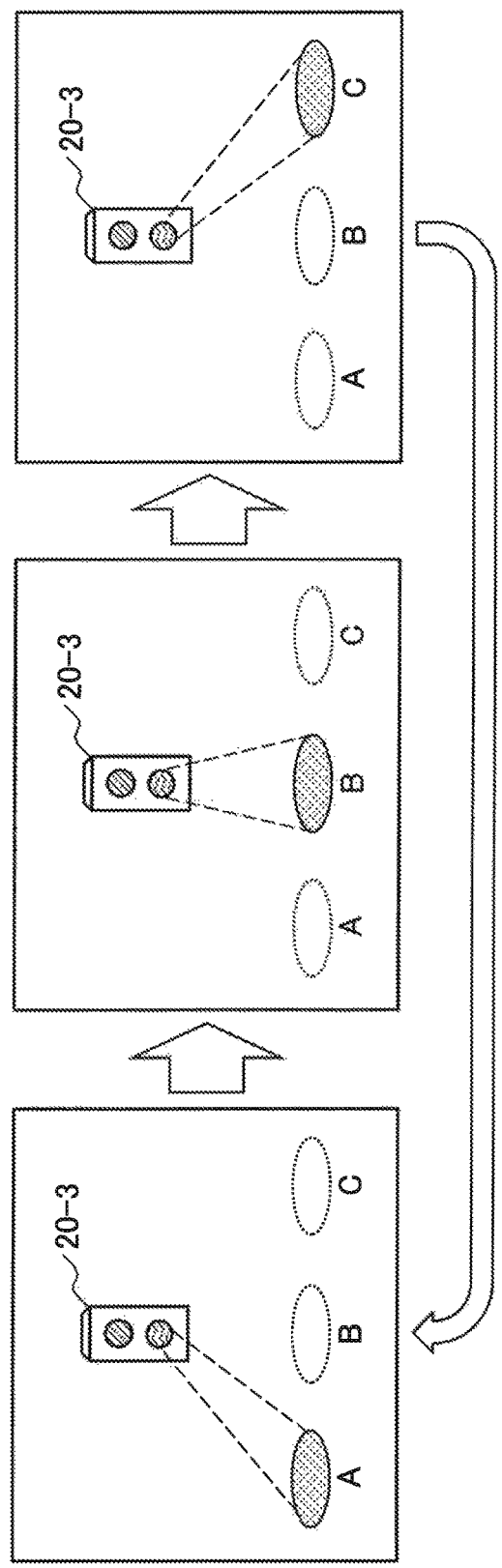
FIG. 32 is a conceptual diagram illustrating a modified example of the terminal device in the irradiation system according to the third example embodiment of the present invention.

FIG. 32 is an example of indicating a direction of a detection target by movement of light projected from a terminal device 20-3. It is assumed in the example in FIG. 32 that the detection target is out of frame in a direction of C. Furthermore, a direction indication means 29 may be omitted in the example in FIG. 32.

In FIG. 32, the terminal device 20-3 projects light on a position B after projecting light on a position A and projects light on a position C after projecting light on the position B. Then, the terminal device 20-3 projects light on the position A again after projecting light on the position C. The example in FIG. 32 illustrates that the detection target 201 is out of frame in the direction of C, by switching positions on which light is projected in an order of A, B, and C. Furthermore, when the detection target 201 is out of frame in a direction of A, positions on which light is projected may be switched in an order of C, B, and A.

Figure 33:
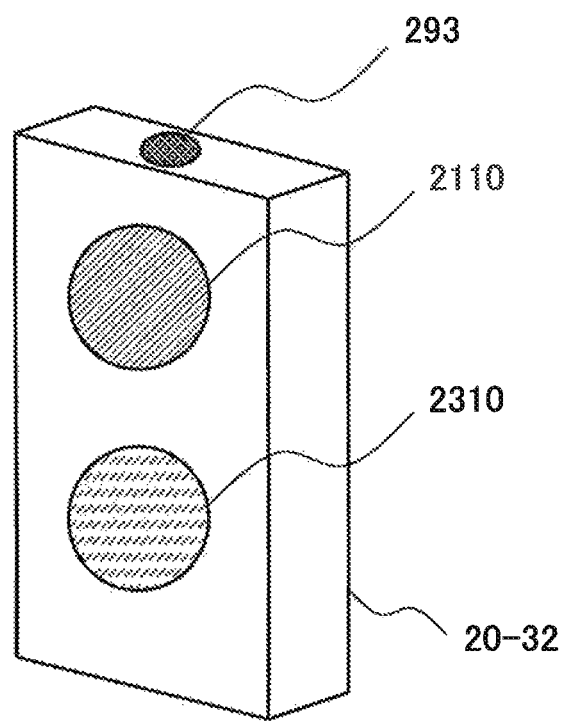
FIG. 33 is a conceptual diagram illustrating a modified example of the terminal device in the irradiation system according to the third example embodiment of the present invention.

FIG. 33 is an example of notifying a direction of a detection target 201 with vibration. A terminal device 20-32 is equipped with a vibration generator 293. A direction indication control means 259 converts direction indication information into vibrations generated from the vibration generator 293. For example, the direction indication control means 259 may indicate a direction of the detection target 201 by a difference in a frequency, an amplitude, and a length of vibration. Further, for example, the direction indication control means 259 may indicate a direction of the detection target 201 by a difference in an interval causing intermittence of vibration. Further, for example, the direction indication control means 259 may indicate a direction of the detection target 201 by a difference in a vibration pattern. A detector attaching the terminal device 20-32 on the chest or the like is able to recognize a direction of the detection target 201 by vibrations generated from the vibration generator 293.

Furthermore, the vibration generator 293 may generate sound as vibration. The vibration generator 293 may emit a sound by a common speaker or the like, or may be configured to emit a sound from a speaker provided on a headphone, an earphone, or the like.

For example, the direction indication control means 259 may indicate a direction of the detection target 201 by a difference in a frequency, an amplitude, and a length of sound. Further, for example, the direction indication control means 259 may indicate a direction of the detection target 201 by a difference in an interval causing intermittence of sound. Further, for example, the direction indication control means 259 is able to indicate a direction of the detection target 201 by a melody type.

(Fourth Example Embodiment)

Next, an irradiation system according to a fourth example embodiment of the present invention will be described referring to drawings. The irradiation system according to the present example embodiment includes a positional information detection means detecting a position of a detection target. Furthermore, it is assumed that a server device according to the present example embodiment has a configuration obtained by adding the positional information detection means to the server device according to the second example embodiment and detects a position of a detection target by using image data captured by a surveillance camera. Further, a terminal device according to the present example embodiment features a function of the target direction indication means 2556 included in the irradiation direction determination means in the terminal device according to the third example embodiment. Though not illustrated, the server device is given a reference sign 10-4 and the terminal device is given a reference sign 20-4 in the description of the present example embodiment. The terminal device 20-4 has the same configuration as the terminal device 20-3 according to the third example embodiment.

Figure 34:
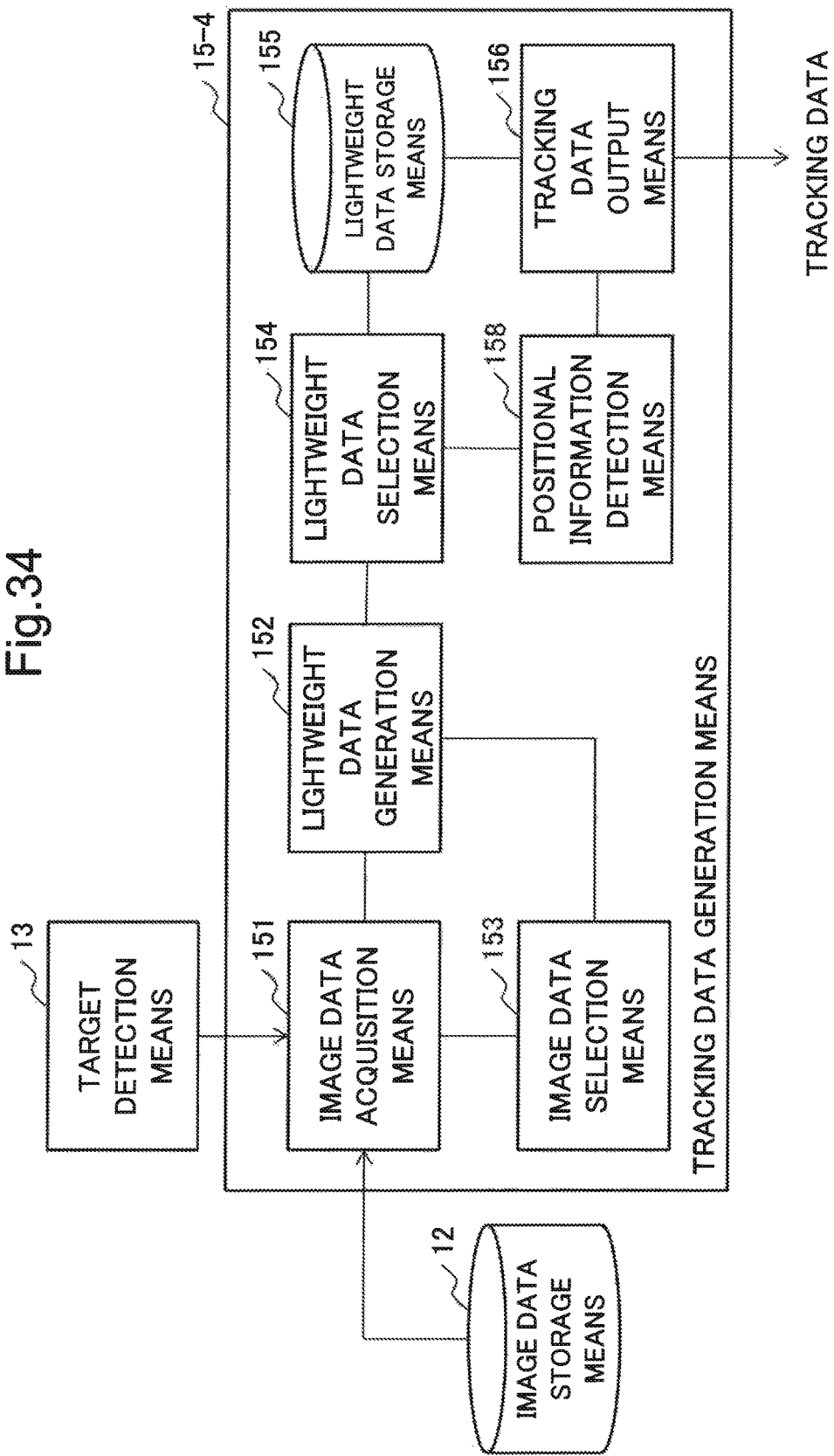
FIG. 34 is a block diagram illustrating a configuration of a tracking data generation means included in a server device in an irradiation system according to a fourth example embodiment of the present invention.

FIG. 34 is a block diagram illustrating a configuration of a tracking data generation means 15-4 included in the server device 10-4 according to the present example embodiment. The tracking data generation means 15-4 has a configuration obtained by adding a positional information detection means 158 to the tracking data generation means 14 in the server device 10 according to the first example embodiment.

The positional information detection means 158 acquires image data captured by a surveillance camera 210 and detects a position of a detection target 201 from the image data. The positional information detection means 158 outputs the positional information of the detection target 201 to a tracking data output means 156.

The tracking data output means 156 adds positional information of the detection target 201 to tracking data and outputs the resulting tracking data to a tracking data transmission means 15.

FIG. 35 is a conceptual diagram illustrating an example of changing an imaging direction of the terminal device 20-4, based on positional information. FIG. 35 is a top view of an area including a monitored area 200 monitored by the terminal device 20-4. It is assumed in FIG. 35 that the monitored area 200 is included in a monitored area 2000 of the surveillance camera 210, and the detection target 201 is positioned in the monitored area 2000.

The diagram on the left in FIG. 35 illustrates a case that the detection target 201 is positioned out of an angle of view of the terminal device 20-4. In the diagram on the left in FIG. 35, the detection target 201 is positioned out of the monitored area 200, and therefore the terminal device 20-4 is not able to recognize the detection target 201 under the present situation.

The diagram on the right in FIG. 35 illustrates a case after an imaging direction of the terminal device 20-4 is changed based on positional information, in such a way that the detection target 201 is positioned within the angle of view of the terminal device 20-4. In the diagram on the right in FIG. 35, the detection target 201 is positioned within the angle of view of the terminal device 20-4. In other words, the detection target 201 is positioned within the monitored area 200, and therefore the terminal device 20-4 is able to recognize the detection target 201.

For example, the tracking data generation means 15-4 in the server device 10-4 outputs, as positional information, position coordinates (x1,y1) of the detection target 201 on an xy plane as illustrated in FIG. 35. When inputting the position coordinates (x1,y1) of the detection target 201, a target direction indication means 2556 in the terminal device 20-4 calculates a condition for the position coordinates (x1,y1) to be included within the monitored area 200 of the local device. In the example in FIG. 35, by turning the imaging direction of the terminal device 20-4 rightward, the detection target 201 is included in the monitored area 200. Accordingly, the target direction indication means 2556 outputs direction indication information for turning the imaging direction of the terminal device 20-4 rightward.

Then, a direction indication control means 259 controls a direction indication means 29 in such a way that the direction indication means 29 gives direction indication for turning the imaging direction of the terminal device 20-4 in a direction based on the direction indication information. The direction indication means 29 gives direction indication as illustrated in the example in FIG. 26 or 27 in accordance with the control by the direction indication control means 259.

As described above, the irradiation system according to the present example embodiment gives direction indication for changing the imaging direction, based on positional information of the detection target positioned out of the angle of view of the terminal device. By the person attached with the terminal device changing a direction of the body in accordance with the direction indication, the detection target comes into the monitored area of the terminal device, and therefore marking light can be reliably irradiated on the detection target.

(Fifth Example Embodiment)

Next, an irradiation system according to a fifth example embodiment of the present invention will be described referring to a drawing. The irradiation system according to the present example embodiment includes a feature detection means detecting a feature of a detection target.

Figure 36:
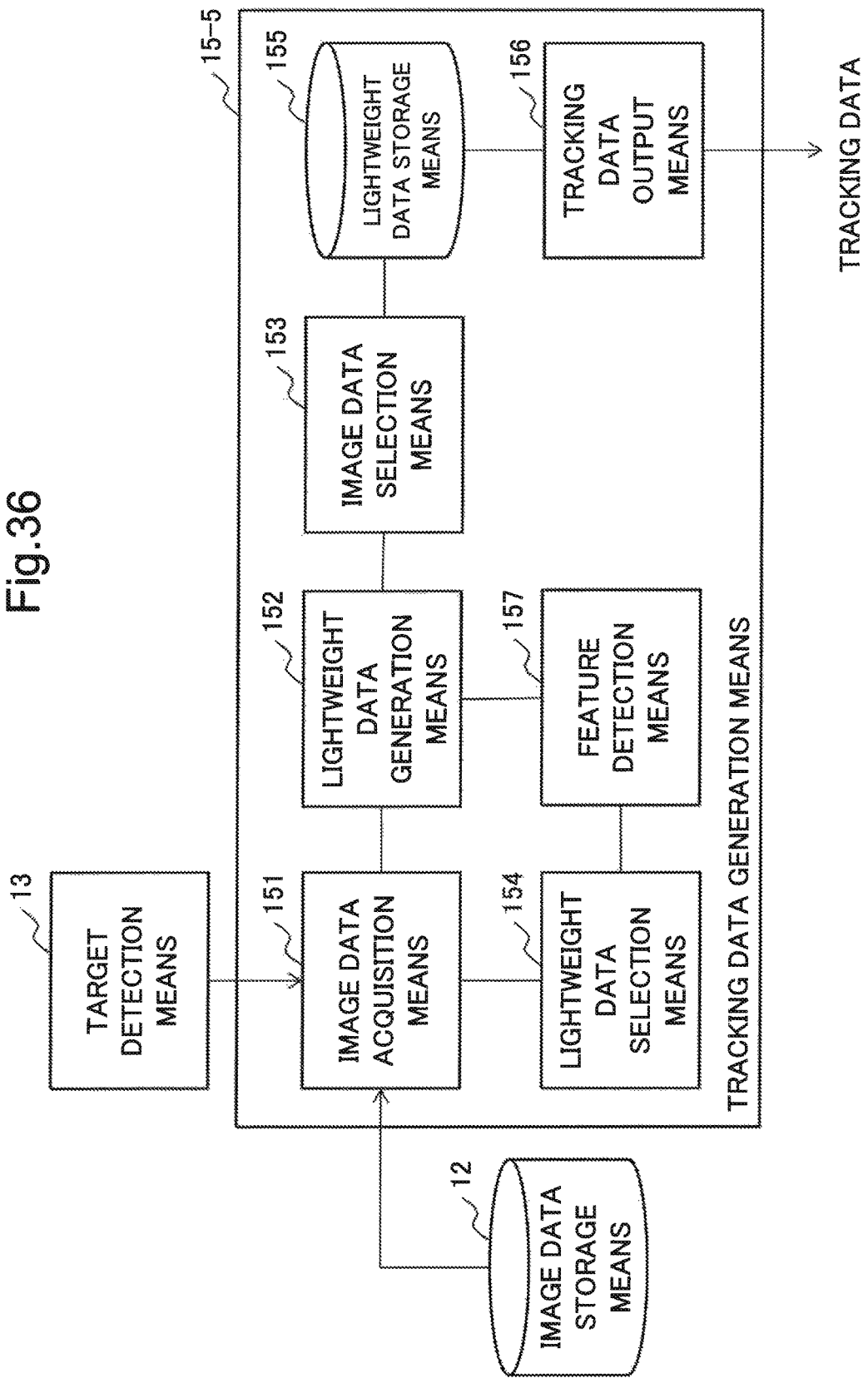
FIG. 36 is a block diagram illustrating a configuration of a tracking data generation means included in a server device in an irradiation system according to a fifth example embodiment of the present invention.

FIG. 36 is a block diagram illustrating a configuration of a server device according to the present example embodiment. A tracking data generation means 15-5 has a configuration obtained by adding a feature detection means 157 to the tracking data generation means 14 in the server device 10 according to the first example embodiment.

The feature detection means 157 detects some feature of a detection target 201 other than lightweight data. The feature detection means 157 outputs the detected feature to a lightweight data generation means 152.

Lightweight data are generated by using the feature detected by the lightweight data generation means 152.

For example, the feature detection means 157 may detect a combination of characteristic points in a search window 3132 or a relative positional relation between characteristic parts as a feature. For example, the feature detection means 157 may extract, as a feature, a combination of colors and shapes of or a positional relation between shoes, a hat, a bag, an accessory, and the like worn or carried by a person being the detection target 201.

For example, the feature detection means 157 may detect an aspect ratio of the search window 3132 as a feature. It is not likely that a big difference in the aspect ratio of the search window 3132 is caused by some degree of change in a posture of the detection target 201. Further, by tracking the aspect ratio on a time-series basis when a person being the detection target 201 transitions from a standing position to another position such as a sitting position, the feature detection means 157 is able to detect a feature from the change in the posture of the detection target 201.

For example, the feature detection means 157 may extract feature points of a person being the detection target 201, such as a head, a neck, a shoulder, a trunk, a hip, a knee, and an elbow, and detect a posture of the detection target 201 by a relative positional relation between the feature points. Further, the feature detection means 157 is able to detect a movement of the person being the detection target 201 from a change in the aforementioned positional relation between the feature points.

Note that the aforementioned features are examples, and the feature detection means 157 may use any feature as long as lightweight data can be supplemented.

In a case that a person being a detection target is extracted from a crowd having similar features related to clothes and outfits, it is assumed that another person around the detection target may be detected when use of identical lightweight data results in a match. An example is a case that the detection target wears a same uniform or carries a same bag as surrounding people. In such a case, depending solely on lightweight data may cause a difficulty in reliably tracking the detection target. In addition to lightweight data, the present example embodiment recognizes a detection target by using another feature. Accordingly, the present example embodiment is able to more reliably track the detection target.

(Sixth Example Embodiment)

Next, an irradiation system according to a sixth example embodiment of the present invention will be described referring to drawings. The irradiation system according to the present example embodiment provides coordination of image data captured by a plurality of cameras.

Figure 37:
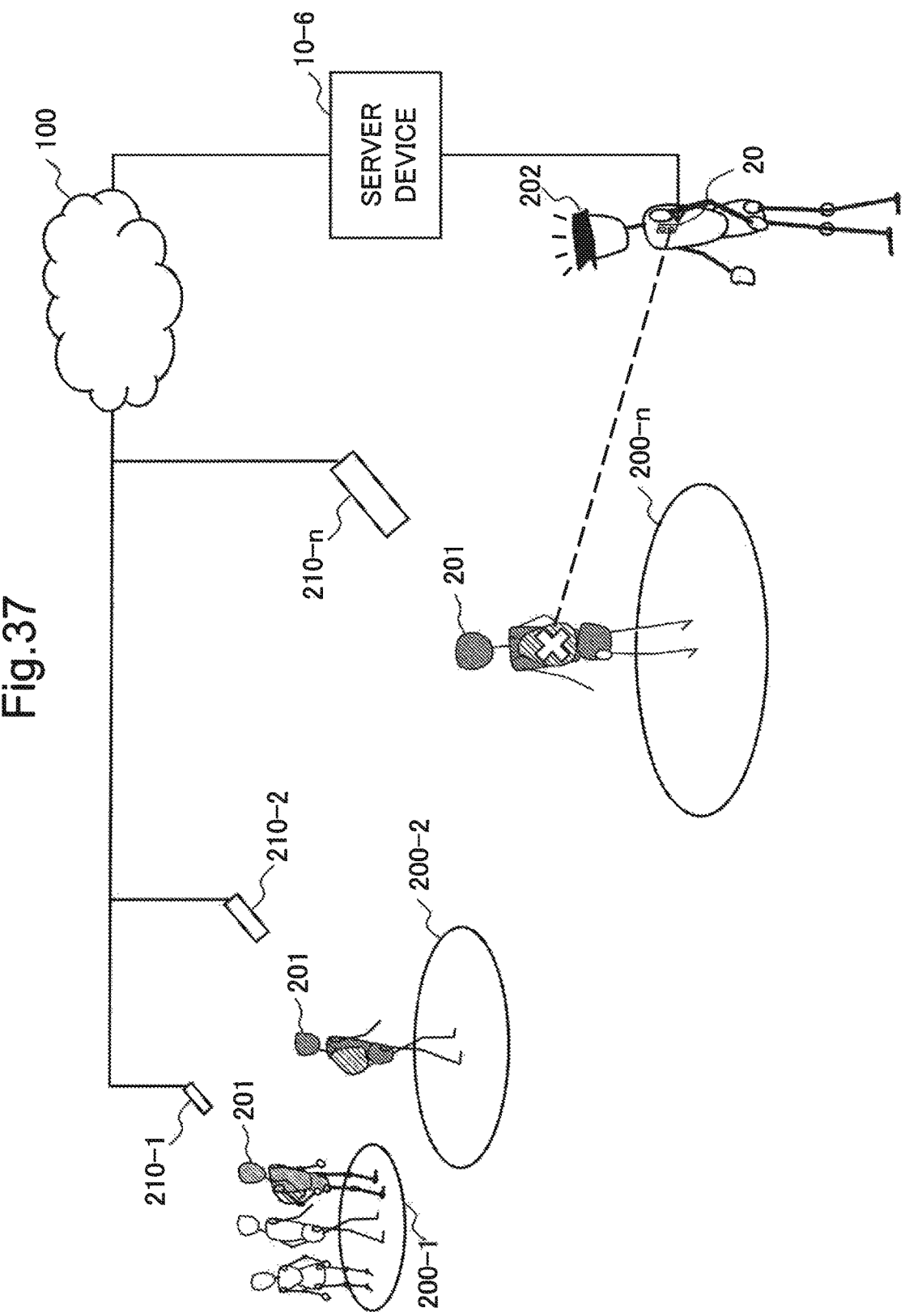
FIG. 37 is a conceptual diagram illustrating a configuration of an irradiation system according to a sixth example embodiment of the present invention.

FIG. 37 is a conceptual diagram of the irradiation system according to the present example embodiment. The irradiation system according to the present example embodiment acquires image data from a plurality of surveillance cameras 210-1 to n (n being a natural number). The plurality of surveillance cameras 210-1 to n monitor specific monitored areas 200-1 to n, respectively. The plurality of surveillance cameras 210-1 to n are connected to a server device 10-6 through a network 100. Furthermore, the irradiation system according to the present example embodiment may include the plurality of surveillance cameras 210-1 to n.

Figure 38:
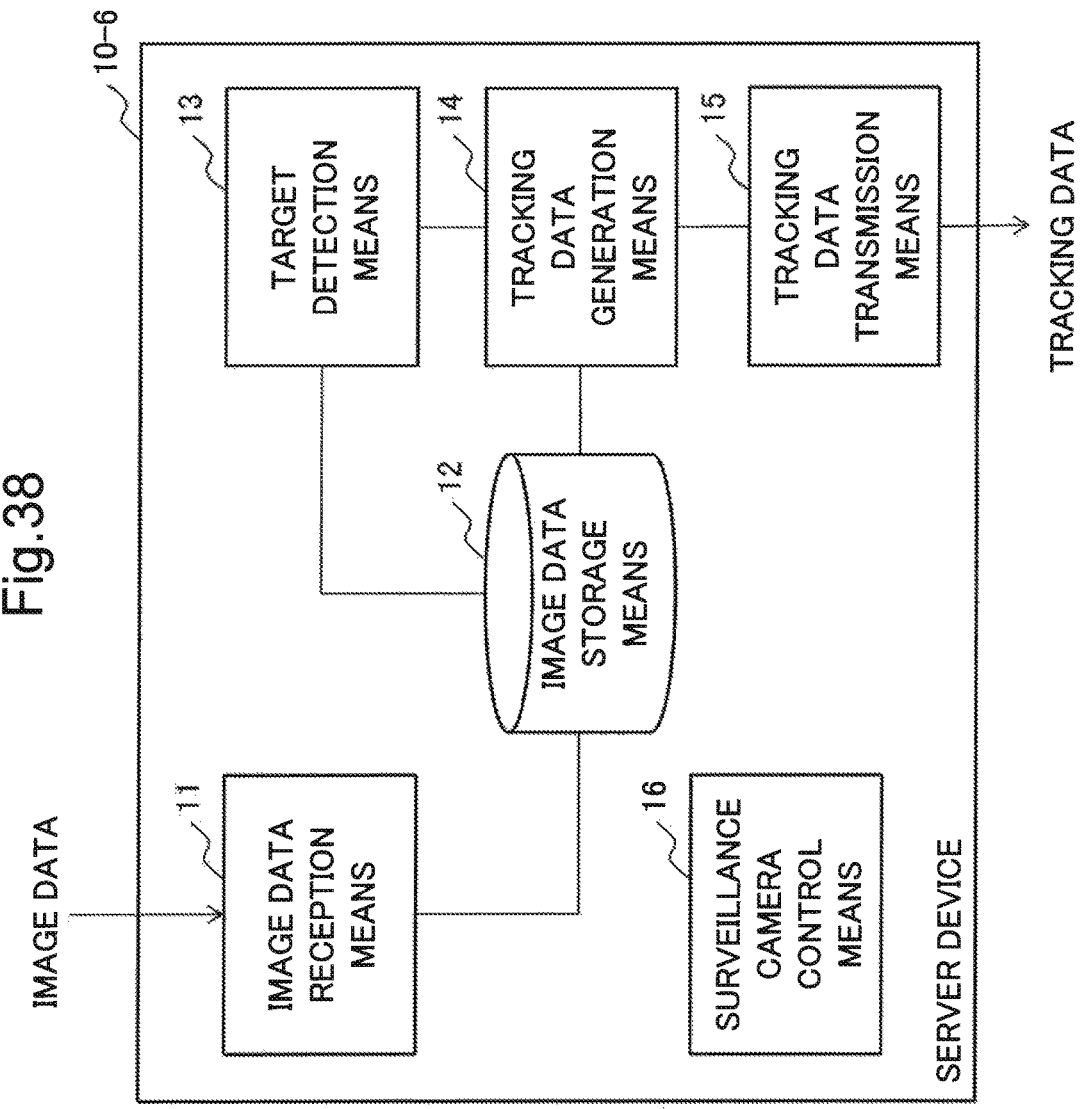
FIG. 38 is a block diagram illustrating a configuration of a server device in the irradiation system according to the sixth example embodiment of the present invention.

As illustrated in FIG. 38, the server device 10-6 has a configuration obtained by adding a surveillance camera control means 16 to the system according to the first example embodiment. The surveillance camera control means 16 performs control and switching of the plurality of surveillance cameras 210-1 to n connected to the server device 10-6.

The server device 10-6 detects a detection target 201 by analyzing image data transmitted from the plurality of surveillance cameras 210-1 to n. The server device 10-6 switches the surveillance cameras 210 with movement of the detection target 201. The server device 10-6 detects a moving direction of the detection target 201 and selects a surveillance camera 210 that is more likely to capture the detection target 201. Consequently, the plurality of surveillance cameras 210-1 to n track the detection target 201 in coordination with one another.

For example, it is assumed that the detection target 201 is detected from image data captured by the surveillance camera 210-1. At this time, the server device 10-6 performs control in such a way that the surveillance camera 210-1 tracks the detection target 201. When the detection target 201 is about to go out of frame from an angle of view of the surveillance camera 210-1, the server device 10-6 performs control in such a way that the surveillance camera 210-2 positioned in a moving direction of the detection target 201 captures the detection target 201. At this time, the surveillance camera control means 16 switches the surveillance cameras 210 with the movement of the detection target 201.

Then, when the detection target 201 intrudes into the monitored area 200-n of a detector 202 attached with a terminal device 20, the server device 10-6 transmits tracking data to the terminal device 20. The terminal device 20 recognizes the detection target 201, based on the received tracking data, and irradiates marking light 300 on the detection target 201. Furthermore, the server device 10-6 may transmit tracking data to the terminal device 20 at a stage when the detection target 201 is approaching the monitored area 200-n.

As described above, the irradiation system according to the present example embodiment is able to continue tracking the detection target while reducing processing in the terminal device, by performing control in such a way that the plurality of surveillance cameras cooperate with one another.

By detecting the detection target from image data captured by any of the surveillance cameras, real time tracking of lightweight data of the detection target can be continued without performing frame thinning, authentication processing, and the like in subsequent processing, according to the present example embodiment. Accordingly, there is no need to consider an authentication processing delay at a stage when the server device transmits tracking data to the terminal device.

In common intra-facility administration, a moving direction of a visitor can be identified to some degree by ingeniously arranging surveillance cameras. Further, blind spots of the surveillance cameras can be decreased by increasing installation density of the surveillance cameras. The irradiation system according to the present example embodiment is able to more reliably recognize a detection target intruding into the facility.

(Hardware Configuration)

Next, a hardware configuration constituting the irradiation systems according to the respective example embodiments will be described, taking a computer 90 in FIG. 39 as an example. Note that the computer 90 in FIG. 39 is a configuration example for enabling the irradiation systems according to the respective example embodiments and does not limit the scope of the present invention. Further, when configuring the wearable terminal device 20 in FIG. 2, it is preferable that the device be a microcomputer having a function of the computer 90 in FIG. 39.

As illustrated in FIG. 39, the computer 90 includes a processor 91, a main storage device 92, an auxiliary storage device 93, an input-output interface 95, and a communication interface 96. The processor 91, the main storage device 92, the auxiliary storage device 93, the input-output interface 95, and the communication interface 96 are connected in a mutually data exchangeable manner through a bus 99. Further, the processor 91, the main storage device 92, the auxiliary storage device 93, and the input-output interface 95 are connected to a network such as the Internet or an intranet through the communication interface 96. The computer 90 is connected to a server and a computer in a higher level system through the network and acquires a phase distribution of display information to be projected and the like from the higher level system.

The processor 91 loads a program stored in the auxiliary storage device 93 or the like into the main storage device 92 and executes the loaded program. The configuration according to the present example embodiment may use a software program installed on the computer 90. The processor 91 performs the arithmetic processing and the control processing in the control means according to the present example embodiment.

The main storage device 92 includes an area into which a program is loaded. For example, the main storage device 92 may be a volatile memory such as a dynamic random access memory (DRAM). Further, a nonvolatile memory such as a magnetoresistive random access memory (MRAM) may be configured or added as the main storage device 92.

The auxiliary storage device 93 is a means that stores data such as a phase distribution of display information. The auxiliary storage device 93 includes a local disk such as a hard disk or a flash memory. Furthermore, the phase distribution of display information may be configured to be stored in the main storage device 92, and the auxiliary storage device 93 may be omitted.

The input-output interface 95 is a device connecting the computer 90 to peripheral equipment, in accordance with a connection standard between the computer 90 and the peripheral equipment. The communication interface 96 is an interface for connecting to the network such as the Internet or an intranet, in accordance with a standard and a specification. Note that an interface is abbreviated to I/F in FIG. 39. The input-output interface 95 and the communication interface 96 may be commonalized as an interface connected to external equipment.

The computer 90 may be configured to be capable of connecting to input equipment such as a keyboard, a mouse, and a touch panel as needed. The input equipment is used for input of information and a setting. Furthermore, when a touch panel is used as the input equipment, a display screen of display equipment may be configured to also serve as an interface of the input equipment. Data exchange between the processor 91 and the input equipment may be mediated by the input-output interface 95.

The communication interface 96 is connected to a higher level system such as another computer or a server through the network. The higher level system transmits a phase distribution of display information used by the respective example embodiments to the computer 90 through the communication interface 96. The higher level system may generate a phase distribution of a basic image used by the respective example embodiments in the local device or acquire the phase distribution from another device.

Further, the computer 90 may be equipped with display equipment for displaying information. When display equipment is equipped, it is preferable that the computer 90 be provided with a display control device (unillustrated) for controlling display by the display equipment. The display equipment may be connected to the computer 90 through the input-output interface 95.

Further, the computer 90 may be equipped with a reader-writer as needed. The reader-writer is connected to the bus 99 and mediates, between the processor 91 and an unillustrated recording medium (program recording medium), reading of data and a program from the recording medium, writing of a processing result by the computer 90 to the recording medium, and the like. For example, the recording medium can be provided by a semiconductor recording medium such as a secure digital (SD) card or a universal serial bus (USB) memory, or the like. Further, the recording medium may be provided by a magnetic recording medium such as a flexible disk, an optical recording medium such as a compact disk (CD) or a digital versatile disc (DVD), or another type of recording medium.

The above describes an example of a hardware configuration enabling the control means according to the example embodiments of the present invention. Note that the hardware configuration in FIG. 39 is an example of a hardware configuration for enabling the system according to the present example embodiment and does not limit the scope of the present invention. Further, a processing program causing the computer to perform processing in the target identification system according to the present example embodiment is also included in the scope of the present invention. Additionally, a program recording medium recording the processing program according to the example embodiments of the present invention is also included in the scope of the present invention.

While the present invention has been described above with reference to the example embodiments, the present invention is not limited to the aforementioned example embodiments. Various changes and modifications that can be understood by a person skilled in the art may be made to the configurations and details of the present invention, within the scope of the present invention.

This application is based upon and claims the benefit of priority from Japanese Patent Application No. 2015-142771, filed on Jul. 17, 2015, the disclosure of which is incorporated herein in its entirety by reference.

REFERENCE SIGNS LIST

10 Server device
11 Image data reception means
12 Image data storage means
13 Target detection means
14 Tracking data generation means
15 Tracking data transmission means
16 Surveillance camera control means
20 Terminal device
21 Imaging means
23 Projection means
25 Control means
27 Communication means
29 Direction indication means
151 Image data acquisition means
152 Lightweight data generation means
153 Image data selection means
154 Lightweight data selection means
155 Lightweight data storage means
156 Tracking data output means
211 Imaging element
213 Image processor
215 Internal memory
217 Data output unit
231 Light source
232 Light source driving unit
235 Spatial modulation element
236 Modulation element control unit
238 Projection unit
251 Imaging control means
252 Image data thinning means
253 Image data output means
255 Irradiation direction determination means
257 Projection condition setting means
258 Projection control means
259 Direction indication control means
1521 Search window setting means
1522 Image data lightening means
2551 Data reception means
2552 Target recognition means
2553 Target following means
2554 Irradiation direction setting means
2555 Irradiation direction output means
2556 Target direction indication means

What is claimed is:

1. An irradiation system comprising:
a server that includes at least one processor, the at least one processor being configured to
   detect a detection target from image data capturing a monitored area
   generate first lightweight data obtained by lightening an amount of data in a plurality of pieces of the image data, each piece of the plurality of pieces of the image data being captured in a time span including a capture time of detection image data in which the detection target is detected, and
   transmit tracking data obtained by aggregating a first plurality of pieces of the generated first lightweight data; and
a terminal device that includes an imaging device and a projection device, the imaging device being configured to capture the monitored area and generate the image data,
   the terminal device being configured to transmit the image data to the server and also to receive the tracking data from the server,
   the projection device being configured to irradiate light on the detection target based on the received tracking data.

2. The irradiation system according to claim 1, wherein the at least one processor of the server is further configured to:
   receive the image data;
   detect the detection target from the received image data by authentication processing;
   generate the first lightweight data by lightening an amount of data in a plurality of pieces of the received image data, each piece of the plurality of pieces of the received image data being captured in a time span including a capture time of the detected image data in which the detection target is detected and generate the tracking data obtained by aggregating a first plurality of pieces of the generated first lightweight data; and transmit the generated tracking data to the terminal device, wherein the terminal device further includes a controller that is configured to control the imaging device to capture the monitored area and control the projection device to irradiate light toward the detection target based on the tracking data.

3. The irradiation system according to claim 2, wherein the at least one processor is further configured to:

generate the first lightweight data by lightening an amount of data in the image data including the detection target, select an image data group obtained by thinning out a plurality of pieces of the image data captured around a time when the detection image data is captured, acquire a second plurality of pieces of the first lightweight data and select a lightweight data group for recognizing the detection target from the acquired second plurality of pieces of the first lightweight data; and generate and output the tracking data, the tracking data including the lightweight data group.

4. The irradiation system according to claim 3, wherein the at least one processor is further configured to:

set a search window surrounding the detection target detected on the image data; and generate a histogram in the set search window.

5. The irradiation system according to claim 3, wherein the at least one processor is further configured to:

generate second lightweight data by lightening an amount of data in the detection image data in which the detection target is detected, and detect the detection target using the second lightweight data, out of a plurality of pieces of image data captured in a time span including a time when image data in which the detection target is detected are captured.

6. The irradiation system according to claim 2, wherein the controller of the terminal device is further configured to acquire the tracking data and the image data, and determine a direction in which light is irradiated on the detection target based on the tracking data;

set a condition for projecting light on the detection target based on the determined direction to irradiate the light; and control the projection device to project light based on the set condition for projecting light.

7. The irradiation system according to claim 2, wherein the controller of the terminal device is further configured to thin out a plurality of pieces of the image data, and transmit the plurality of pieces of image data thinned out to the server.

8. The irradiation system according to claim 3, wherein the at least one processor of the server is further configured to: detect a moving direction of the detection target by inspecting the second plurality of pieces of the first lightweight data on a time-series basis, generate the tracking data including a moving direction of the detection target, generate and output direction indication information indicating a direction in which the detection target is positioned, based on the tracking data including the moving direction of the detection target, wherein the terminal device further includes a direction indication device that indicates a direction in which the detection target is positioned, and the controller is further configured to control the direction indication device based on the direction indication information.

9. The irradiation system according to claim 8, wherein the direction indication device is a direction indicator indicating the direction in which the detection target is positioned.

10. The irradiation system according to claim 8, wherein the direction indication device is a vibration generator configured to generate a vibration indicating the direction in which the detection target is positioned.

11. The irradiation system according to claim 8, wherein the controller of the terminal device is further configured to control the projection device to project light in order to function as the direction indication device based on the direction indication information.

12. The irradiation system according to claim 2, wherein the at least one processor of the server is further configured to generate the tracking data using image data captured by at least one surveillance camera different from the imaging device of the terminal device.

13. The irradiation system according to claim 12, wherein the at least one processor of the server is further configured to control a plurality of surveillance cameras different from the imaging device of the terminal device in a coordinated manner, and generate the tracking data by using a plurality of pieces of image data captured by the plurality of surveillance cameras.

14. The irradiation system according to claim 12, further comprising at least one surveillance camera different from the terminal device.

15. The irradiation system according to claim 12, wherein the at least one processor of the server is further configured to detect positional information of the detection target from image data captured by the at least one surveillance camera, generate the tracking data including the positional information of the detection target, generate and output direction indication information indicating a direction in which the detection target is positioned based on the positional information of the detection target, wherein the terminal device further includes a direction indication device that indicates a direction in which the detection target is positioned, and the controller is further configured to control the direction indication device based on the direction indication information.

16. The irradiation system according to claim 3, wherein the at least one processor is further configured to: detect a plurality of features of the detection target from the image data including the detection target, and generate the first lightweight data using the detected plurality of features.

17. The irradiation system according to claim 1, wherein the projection device includes:

a light source;

a spatial modulation element configured to reflect light from the light source and output a reflected light having a phase distribution of a pattern projected on the detection target.

18. An irradiation method comprising:
by a processor,
  detecting a detection target from image data of a monitored area;
  generating lightweight data obtained by lightening an amount of data in a plurality of pieces of the image data, each piece of the plurality of pieces of the image data being captured in a time span including a capture time of detection image data in which the detection target is detected; and
transmitting tracking data obtained by aggregating a plurality of pieces of the generated lightweight data to a terminal device, the terminal device including an imaging device and a projection device, the imaging device capturing the monitored area, generating the image data, and transmitting the image data, the projection device irradiating light on the detection target based on the received tracking data.

19. A non-transitory program storage medium storing an irradiation program causing a computer to perform:
  detection of a detection target from image data of a monitored area;
  generation of lightweight data obtained by lightening an amount of data in a plurality of pieces of the image data, each piece of the plurality of pieces of image data being captured in a time span including a capture time of detection image data in which the detection target is detected; and
  transmission of tracking data obtained by aggregating a plurality of pieces of the generated lightweight data to a terminal device, the terminal device including an imaging device and a projection device, the imaging device capturing the monitored area, generating the image data, and transmitting the image data, the projection device irradiating light on the detection target based on the received tracking data.

* * * * *